US011450463B2

(12) United States Patent
Chossat et al.

(10) Patent No.: US 11,450,463 B2
(45) Date of Patent: Sep. 20, 2022

(54) PROGRAMMABLE PERMANENT MAGNET ACTUATOR AND A MAGNETIC FIELD GENERATION APPARATUS AND METHOD

(71) Applicant: ROBOTIQ INC., St-Nicolas (CA)

(72) Inventors: Jean-Baptiste Chossat, Aix en Provence (FR); Vincent Duchaine, Mont-Saint-Hilaire (CA); Jean-Simon Lavertu, Montreal (CA)

(*) Notice: Subject to any disclaimer, the term of this patent is extended or adjusted under 35 U.S.C. 154(b) by 236 days.

(21) Appl. No.: 16/967,067

(22) PCT Filed: Feb. 1, 2019

(86) PCT No.: PCT/CA2019/050134
§ 371 (c)(1),
(2) Date: Aug. 3, 2020

(87) PCT Pub. No.: WO2019/148292
PCT Pub. Date: Aug. 8, 2019

(65) Prior Publication Data
US 2021/0043347 A1    Feb. 11, 2021

Related U.S. Application Data

(60) Provisional application No. 62/625,418, filed on Feb. 2, 2018.

(51) Int. Cl.
*H01F 7/02* (2006.01)
*H01F 7/04* (2006.01)
*B25J 15/06* (2006.01)

(52) U.S. Cl.
CPC ........ *H01F 7/0242* (2013.01); *B25J 15/0608* (2013.01); *H01F 7/0284* (2013.01); *H01F 7/04* (2013.01)

(58) Field of Classification Search
CPC ........ H01F 7/0242; H01F 7/0284; H01F 7/04; H01F 5/00; H01F 7/0231; H01F 7/0278;
(Continued)

(56) References Cited

U.S. PATENT DOCUMENTS 4,075,589 A   2/1978   Braillon
4,355,236 A   10/1982  Holsinger
(Continued)

FOREIGN PATENT DOCUMENTS

CN    201146439 Y    11/2008
CN    101431263 A    5/2009
(Continued)

OTHER PUBLICATIONS

Sakai, Kazuto, et al. "Principle of the variable-magnetic-force memory motor." Electrical Machines and Systems, 2009. ICEMS 2009. International Conference on. IEEE, 2009.
(Continued)

*Primary Examiner* — Mohamad A Musleh
(74) *Attorney, Agent, or Firm* — Anglehart et al.

(57) ABSTRACT

A programmable permanent magnet actuator, a magnetic field generation apparatus and a method of controlling thereof. The actuator has a first body that is a ferromagnetic material, a second body that is a single magnetized ferromagnet and a magnetic field generation device associable to the second body to generate a magnetic field in proximity with the second body. The actuator also has a controller adapted to control the magnetic field generation device to generate a controlled magnetic field. The controlled magnetic field is adapted to modify a magnetization of the second body such as to produce with the second body a required magnetic field to move one of the first or the second body with respect to one another according to a desired position or a desired torque. The desired position or the
(Continued)

desired torque is maintained even after the application of the controlled magnetic field. The apparatus has a permanent magnet that has an intrinsic coercivity (Hci) value that is greater than 200 kA/m and a remanence (Br) value that is greater than 0.4 Tesla. The apparatus also has a magnetic field generation device associated to the permanent magnet and a controller connected to the magnetic field generation device. The controller is adapted to control the magnetic field generation device to produce a controlled magnetic field to variably modify a magnetization of the permanent magnet in order to produce a desired variable magnetic field and influence the electrically charged or magnetized material when placed in the desired variable magnetic field.

20 Claims, 29 Drawing Sheets

(58) Field of Classification Search
CPC .. H01F 7/06; B25J 15/0608; B25J 9/12; B25J 15/00; H02K 1/02
See application file for complete search history.

(56) References Cited

U.S. PATENT DOCUMENTS

| | | | |
|---|---|---|---|
| 4,757,224 | A | 7/1988 | McGee et al. |
| 7,598,646 | B2 | 10/2009 | Cleveland |
| 7,956,565 | B2 | 6/2011 | Himmelmann |
| 8,129,931 | B2 | 3/2012 | Maekawa et al. |
| 8,269,390 | B2 | 9/2012 | Sakai et al. |
| 8,330,404 | B2 | 12/2012 | Sakai et al. |
| 8,334,667 | B2 | 12/2012 | Sakai et al. |
| 8,373,325 | B2 | 2/2013 | Ichiyama |
| 8,569,921 | B2 | 10/2013 | Sakai et al. |
| 8,624,457 | B2 | 1/2014 | Sakai et al. |
| 8,674,576 | B2 | 3/2014 | Knaian et al. |
| 8,860,356 | B2 | 10/2014 | Yuuki et al. |
| 9,306,423 | B2 | 4/2016 | Jang et al. |
| 9,515,525 | B2 | 12/2016 | Shibata |
| 9,525,330 | B2 * | 12/2016 | Knaian .................. H02K 21/04 |
| 10,146,211 | B2 | 12/2018 | Fukushige et al. |
| 2008/0224557 | A1 | 9/2008 | Cleveland |

FOREIGN PATENT DOCUMENTS

| | | |
|---|---|---|
| CN | 101325349 B | 12/2010 |
| CN | 102246399 A | 11/2011 |
| CN | 202231589 U | 5/2012 |
| CN | 104979991 A | 10/2015 |
| CN | 105207438 A | 12/2015 |
| CN | 106817003 A | 6/2017 |
| CN | 107116544 A | 9/2017 |
| CN | 105337429 B | 2/2018 |
| CN | 108494197 A | 9/2018 |
| CN | 108964393 A | 12/2018 |
| DE | 2614450 A1 | 10/1977 |
| EP | 2058923 A2 | 5/2009 |
| EP | 2372885 A1 | 10/2011 |
| JP | 2011066992 A | 3/2011 |
| KR | 20180089204 A | 8/2018 |

OTHER PUBLICATIONS

Sakai, Kazuto, Hisanori Hashimoto, and Satoru Kuramochi. "Principle and basic characteristics of hybrid variable-magnetic-force motors." Power Electronics and Applications (EPE 2011), Proceedings of the 2011—14th European Conference on. IEEE, 2011.
"Maekawa, Sari, et al. "Study of the magnetization method suitable for fractional-slot concentrated-winding variable magnetomotive-force memory motor." IEEE Trans. Power Electron. 29.9 (2014): 4877-4887.https://ieeexplore.ieee.org/stamp/stamp.jsp?arnumber=6656020".
Ibrahim, Maged, Lesedi Masisi, and Pragasen Pillay. "Design of variable flux permanent-magnet machine for reduced inverter rating." IEEE Transactions on Industry Applications51.5 (2015): 3666-3674.
Ibrahim, Maged, Lesedi Masisi, and Pragasen Pillay. "Design of variable-flux permanent-magnet machines using alnico magnets." IEEE Transactions on Industry Applications 51.6 (2015): 4482-4491.
Limsuwan, Natee, et al. "Design and evaluation of a variable-flux flux-intensifying interior permanent-magnet machine." IEEE Transactions on Industry Applications 50.2 (2014): 1015-1024.
Ostovic, Vlado. "Memory motors." IEEE Industry Applications Magazine 9.1 (2003): 52-61.
Liu, Hengchuan, et al. "Permanent magnet remagnetizing physics of a variable flux memory motor." IEEE Transactions on Magnetics 46.6 (2010): 1679-1682.
International application No. PCT/CA2019/050134 Supplementary International Search Report dated Jun. 2, 2020.
International application No. PCT/CA2019/050134 International Search Report dated Jun. 10, 2019.
International application No. PCT/CA2019/050134 Search Strategy dated Jun. 10, 2019.
International application No. PCT/CA2019/050134 Written Opinion of the International Searching Authority dated Jun. 10, 2019.
The related Chinese application No. 201980024347.0 Office Action dated Oct. 15, 2021 with the brief translation of the examiner's main opinions.

* cited by examiner

Halbach magnet positioning and orientation equations, with schematic of a quarter of a Halbach array with n=12 and k=1

PROGRAMMABLE PERMANENT MAGNET ACTUATOR AND A MAGNETIC FIELD GENERATION APPARATUS AND METHOD

CROSS-REFERENCE TO RELATED APPLICATIONS

This application claims priority of U.S. provisional patent application 62/625,418 filed Feb. 2, 2018, the contents of which are hereby incorporated by reference.

TECHNICAL FIELD

The present relates to actuators and to magnetization of hard ferromagnetic material, more particularly the present relates to actuators that magnetize hard ferromagnetic material and to generating magnetic fields with a magnetization of hard ferromagnetic material.

BACKGROUND

Robots are poised to gain importance in many applications, such as health care, the military, manufacturing, and indeed any field where humanoid robots may replace human physical labor. However, contemporary humanoid robots have limited functionality compared to humans. Despite great technological advancement, even state-of-the-art humanoid robots today are slow and clumsy compared to any able human. One reason for this is the present-day limits of robotic actuation.

The main problem with robotic actuation is that conventional electromagnetic motors are inherently ill-suited to robots. It might seem surprising that out of the variety of motors that have been developed and improved upon since the 1830s, not a single one is truly appropriate for robots. Even though recent research in motors has brought about great improvements in electric vehicles, for instance, however the same has not been done for robots, because robots require a completely different type of actuation.

Conventional motors, such as DC or brushless motors, reach high efficiency at high speeds due to a generated back electromotive force (EMF) as shown in graph 100 of Prior Art FIG. 1. As can be noticed, with a conventional motor running at a low rotation per minute (RPM), most of the input power ($P_{in}$) is lost ($P_{loss}$) and only a low torque can be provided. For instance, at 1000 RPM, an input power of 165 Watts is applied, however over 125 Watts are lost and only about 35 Watts of mechanical power is available resulting in a relatively low torque output, since $P_{mech}=\tau\omega$. However, robotic applications typically require a low-speed (e.g. low RPM) and high-torque movement, for which conventional motors are inefficient.

As can be seen in Prior Art FIGS. 2A and 2B, a conventional motor having a stator 202 and rotor 204. The stator 202 has copper coils 201 and body composed of a soft ferromagnetic material 206, in this instance a brushless motor 200, operates by drawing an electric current through copper coils 201 in order to generate a magnetic field around the rotor. The rotor has a cylindrical permanent magnet 204 that is magnetized in the radial direction and has four magnetic poles as shown in FIG. 2A. Thus when the electric current is deactivated, there is only one magnetic field (the rotor's 204) remaining and the motor is motionless. When the electric current is activated, there are two magnetic fields (the rotor's and the stator's), and since disaligned magnetic poles repel each other, the rotor 204 will spin in this case.

The conventional brushless motor 200, takes the electrical power that is supplied ($P_{in}$), and transforms it with some loss ($P_{loss}$) into mechanical power ($P_{mech}$), where the latter is a direct function of torque and rotational speed. This relation is given by:

$$P_{in}=P_{loss}P_{mech},$$

where $$P_{in}=Vi,$$

$$P_{mech}=\tau\omega,$$

$$P_{loss}=i^2R,$$

and where i is the actuator's current, V is its voltage, and R is the electrical resistance of the winding.

When the motor 200 operates at its maximum speed, it is not able to exert any torque. This property is known as the no load speed, and when it is reached there is very little power output. However, the motor is still operating quite efficiently because it is not drawing much electrical power either, due to a phenomenon called back electromotive force (back EMF). This phenomenon balances the voltage applied across the windings, thereby reducing the effective current flow and heat generation in the windings.

As can be seen from Prior Art FIG. 1, which was made using the datasheet of the Maxon brushless motor 339286. The electrical power that is supplied ($P_{in}$) is transformed with some power loss ($P_{loss}$) into mechanical power ($P_{mech}$) The mechanical power value is a direct function of the torque and the rotational speed ($P_{mech}=\tau\omega$)). As can be noticed from graph 100 of FIG. 1, when a conventional motor operates at its maximum speed, it is not able to exert any torque. However, the motor is still operating quite efficiently since it does not draw much electrical power due to a known phenomenon called back electromotive force (back EMF). At medium-to-high RPM, the motor is highly efficient since there is a lower amount of power loss than at low RPM. At low RPM speeds the motor produces very little power and torque and there is not as much back EMF to help lower the power input. Instead, the motor is consuming its maximum amount of electrical energy and when there is no speed, most of the energy is wasted in the form of heat. To summarize, conventional motors exhibit very good efficiency at high speeds, and very low efficiency at low speeds.

The inefficiency of conventional motors at low speeds has several consequences for some applications such as robotic applications. For instance, robots that usually run at low RPM consume so much power that they are unable to run on batteries for more than brief periods of time. Moreover, the amount of excess heat that is generated (as described by the Joule effect), when running at low RPM, can result in damage to the motor. Also, due to the risk of heat damage, the actuator's output torque must be limited.

A typical work-around to this problem has been to use gearboxes. By changing the ratio of speed to torque, gearboxes allow the motor to operate at a higher speed, which is more efficient. However, gearboxes introduce new issues such as backlash, additional weight, high reflected inertia during collisions, and sometimes non-backdriveability.

Another problem with gearboxes is that they do not help with efficiency in situations where a robot has to apply torque in a fixed position. This is particularly relevant to robots (as opposed to say, automotive vehicles), because they frequently need to apply torque while immobile, such as while gripping an object or standing upright. In these scenarios, the motor at the robot's joint must maintain torque without rotating; and thus the motor is operating in the zero-efficiency zone (maximum power input and zero power output), as pointed by arrow 102 in graph 100 of prior art FIG. 1.

Numerous attempts have been made to circumvent the shortcomings of conventional motors. One approach has been to improve the actuator's heat dissipation properties. One known method is a water-cooled motor system that helped the SCHAFT team win the DARPA (the Defense Advanced Research Projects Agency) competition trials. Their robot's actuator is able to output higher torque because the excess heat is dissipated by a custom-built liquid cooling system. Consequently, SCHAFT's robot did not require such large and heavy motors as are usually needed to output high torque, and therefore it could lift more weight relative to its size. Although this method provides advantages, it still does not address the root of the problem: the inefficiency of conventional motors in most robotic applications. SCHAFT's robot is stronger than its predecessors, but only because it quickly dissipates energy.

Another way to deal with the high torque demands of robots has been through static balancing, which has been promoted for increased robot compliance and human safety as well as reduced motor power consumption. Different systems such as springs or counter weights have been proposed to achieve this. One benefit of static balancing is that it is compliant with safety regulations. For instance, by using a spring, the applied weight is partially borne by the spring, so the robot's limbs can be adjusted and a user can push the robot's arm back and forth even if the power is off. However, a problem with this solution is that it uses passive elements and their parameters cannot be adjusted. With a spring, for instance, the spring's parameters—such as strength or stiffness—cannot be adjusted while it is in use.

Another recently proposed approach is to use the electromagnetic force contained in magnets to actuate a rotor and maintain a fixed position of the rotor without further energy input. U.S. Pat. No. 8,674,576 and U.S. Pat. No. 9,525,330 to Knaian et al. present an actuator 300 using electropermanent magnets, as shown in Prior Art FIG. 3A. It is known that an electropermanent magnet is a type of permanent magnet in which the external magnetic field can be switched "on" or "off" by a pulse of electric current in a wire winding around part of the magnet. The magnet consists of two sections, one of "hard" (high coercivity) magnetic material and one of "soft" (low coercivity) magnetic material such as taught in U.S. Pat. No. 4,075,589. The direction of magnetization in the latter piece can be switched by a pulse of current in the wire winding. As presented in Prior Art FIG. 3B, when the magnetically soft 308 and hard 310 materials have opposing magnetizations 320, the magnet produces no net external field across its poles, while when their direction of magnetization is aligned 322 the magnet produces an external magnetic field.

As can be noticed in FIG. 3A, the actuator 300 has a cross-shaped stator 302 and a circular shaped rotor 304 made from a ferromagnetic material such as iron. The rotor 304 is positioned to freely rotate around the stator 302. The stator 302 has at each of its ends an electropermanent magnet which consist of a pair of adjacently positioned permanent magnets (308 and 310) placed between iron bodies 306 to confine the magnetic field produced by the electropermanent magnet. One of the pair of permanent magnets is made from a softer ferromagnetic material such as an AlNiCo magnet 308 and its magnetization can be changed according to current pulses in the wire winding 312. The other permanent magnet is made from a harder ferromagnetic material such as an neodymium (NdFeB) magnet 310 and maintains its magnetization. Depending on the current pulses in the wire winding 312, the AlNiCo magnet 308 changes its magnetization and produces with the NdFeB magnet a magnetic field that either attracts the rotor 322 or has no effect on the rotor 320. As depicted in FIG. 3C, when each electropermanent magnet is sequentially activated 320, the changing position of the produced electromagnetic attractive forces on the rotor 304 induces a clockwise circular motion of the rotor 304.

The EPM actuator 300 changes the magnetization of one magnet 308 to control the combined magnetic fields of the two magnets (308 and 310). One of the limitations of using the EPM in an actuator is that the arrangement of the two magnets results in an actuator with a near-binary on/off function. Controlling the amount of magnetization is therefore difficult, since the external field can practically only be turned on and off. Moreover, due to the very high coercivity of the NdFeB magnet 308, it is impossible to reverse the direction of the external magnetic field produced by the combined magnetic fields of the two magnets (308 and 310). Since the field always goes in a same direction, the stator can only push in one direction (or be off). Another limitation is that the motor is relatively weak and provides only low torque levels that are difficult to adjust. Knaian et al. acknowledge that their work is better for small applications such as smart matter, as opposed to large applications such as humanoid robots. This actuator can be used to create programmable matter and electropermanent valves such as in soft robots, which is a robot constructed with highly compliant material similar to that found in living organisms. A modified version of this actuator was also proposed for use in a drone latching mechanism and is referred to as the "OpenGrab EPM", it enables a high payload while maintaining low power cost.

Therefore there is a need for a motor that provides an adjustable torque that can be low or high torque even at a low rotational speed, and that is applicable to various robotic applications, be they small, medium, or large applications.

SUMMARY

Applicant has discovered that an actuator having a Programmable Permanent Magnet (PPM) can use high transient current pulses to store magnetic fields in hard ferromagnetic material. This is unlike conventional electromagnetic motors that use constant current to generate magnetic fields or the EPM actuator in which an electric pulse causes the combined magnetic fields of the two magnets to be on or off. In one embodiment, a specific grade of ferromagnetic material that does not demagnetize when exposed to a strong neodymium magnetic field of the rotor, and which can store a large magnetic field is selected to be used in the stator of the actuator. The actuator passively generates an adjustable torque and is particularly suited for low-speed direct-drive applications. Which can be advantageous for robotic grasping, active prosthetics, and robotic legged locomotion.

According to one aspect there is an actuator having a first body that is a ferromagnetic material, at least one second body that is a magnetized ferromagnetic material and is in proximity with the first body and a magnetic field generation device associable to each of the at least one second body and adapted to generate a magnetic field in proximity with the at least one associated second body. The actuator also has a controller adapted to control the magnetic field generation device in order to generate a controlled magnetic field. The controlled magnetic field is adapted to modify a magnetization of the at least one associated second body such as to produce with the at least one second body a required magnetic field to move one of the first or the at least one second body with respect to one another according to a desired position or according to a desired torque to be produced with the first body and the required magnetic field of the at least one second body. The desired position or the desired torque is maintained even after the application of the controlled magnetic field. Also, the second body maintains its modified magnetization even when in presence of a resulting magnetic field produced as a result of a relative movement between the first body and the at least one second body.

In some embodiments, there is provided a motor comprising a first body that is a magnetized ferromagnetic material and at least two second bodies that are single magnetized ferromagnetic material bodies, the at least two second bodies being in proximity with the first body and provided in a stator/rotor arrangement. Coils are arranged in association with the at least two second bodies to generate a magnetic field in proximity with the at least two associated second bodies to modify a magnetization of the at least two associated second bodies. The magnetic fields of at least two second bodies combine to provide a variable direction and strength magnetic field of the combination of the second bodies that can interact with the magnetic field of the first body to provide for rotation. The motor may further comprise a controller adapted to control a current supplied to the coils in order to generate a controlled magnetic field adapted to modify a magnetization of the at least two associated second bodies such as to produce with the at least two second bodies a required magnetic field to move one of the first or the at least two second bodies with respect to one another according to a desired position or according to a desired torque to be produced with the first body and the required magnetic field of the at least two second bodies, where the desired position or the desired torque is maintained even after the application of the controlled magnetic field and where the at least two second bodies maintain their modified magnetization even when in presence of a resulting magnetic field produced as a result of a relative movement between the first body and the at least two second bodies.

According to some embodiments, there is provided a method of controlling the actuator. This method can include controlling the sequence of pulses of current for the coils or solenoids used in reprogramming the single permanent magnets so that a desired motion and actuation force is achieved.

According to some embodiments, there is provided a method of manufacturing a product comprising using a robotic gripper including the actuator to manipulate the product, for example using less power during the manipulation operation that with a conventional electric motor drive.

According to another aspect there is a magnetic field generation apparatus and method of controlling such an apparatus. The apparatus has at least two permanent magnets that are arranged in a Halbach array arrangement. Each of the at least two permanent magnets has an associated magnetic field generation device. The apparatus also has a controller adapted to control the associated magnetic field generation device in order to generate a controlled magnetic field. The controlled magnetic field is adapted to modify a magnetization of at least one of the at least two permanent magnets in order to produce a desired magnetic field. The magnetization of the at least one of the at least two permanent magnets and the desired magnetic field is maintained even after the generation of the controlled magnetic field.

According to another aspect there is a magnetic field generation apparatus and method of controlling such an apparatus. The apparatus has at least one permanent magnet being arranged as a Halbach array arrangement, each of the at least one permanent magnet having an associated magnetic field generation device. A controller can be adapted to control the associated magnetic field generation device in order to generate a controlled magnetic field adapted to modify a magnetization of the at least one permanent magnet in order to produce a desired magnetic field, where the magnetization of the at least one permanent magnet and the desired magnetic field is maintained even after the generation of the controlled magnetic field.

According to yet another aspect there is an electrically charged or magnetized material influencing apparatus. The apparatus has a permanent magnet that has an intrinsic coercivity (Hci) value that is greater than 200 kA/m and a remanence (Br) value that is greater than 0.4 Tesla. The apparatus also has a magnetic field generation device associated to the permanent magnet and a controller connected to the magnetic field generation device. The controller is adapted to control the magnetic field generation device to produce a controlled magnetic field to variably modify a magnetization of the permanent magnet in order to produce a desired variable magnetic field and influence the electrically charged or magnetized material when placed in the desired variable magnetic field. The variably modified magnetization of the permanent magnet is maintained even after the application of the controlled magnetic field.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 3A:
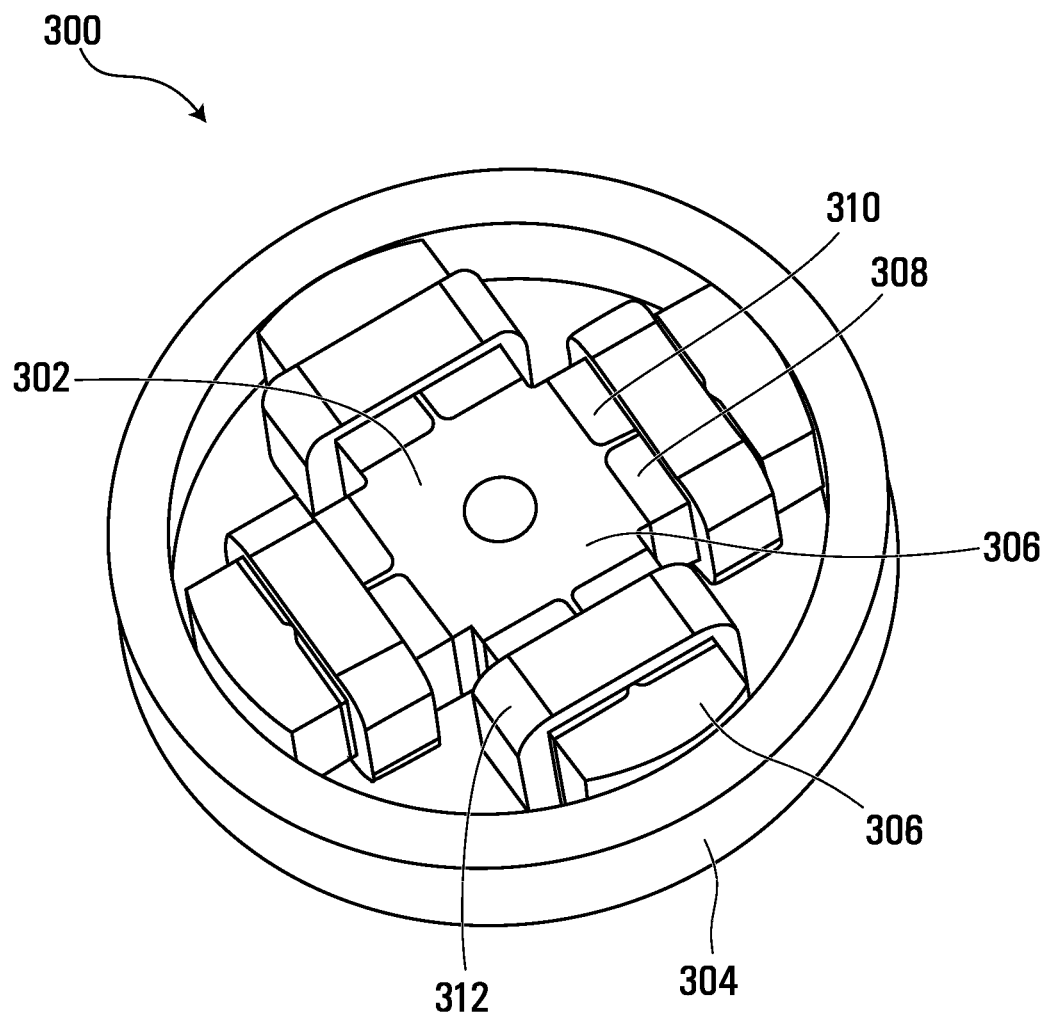
FIG. 3A presents a configuration of electropermanent magnets and a surrounding rotor in a prior art electropermanent actuator.
Figure 3B:
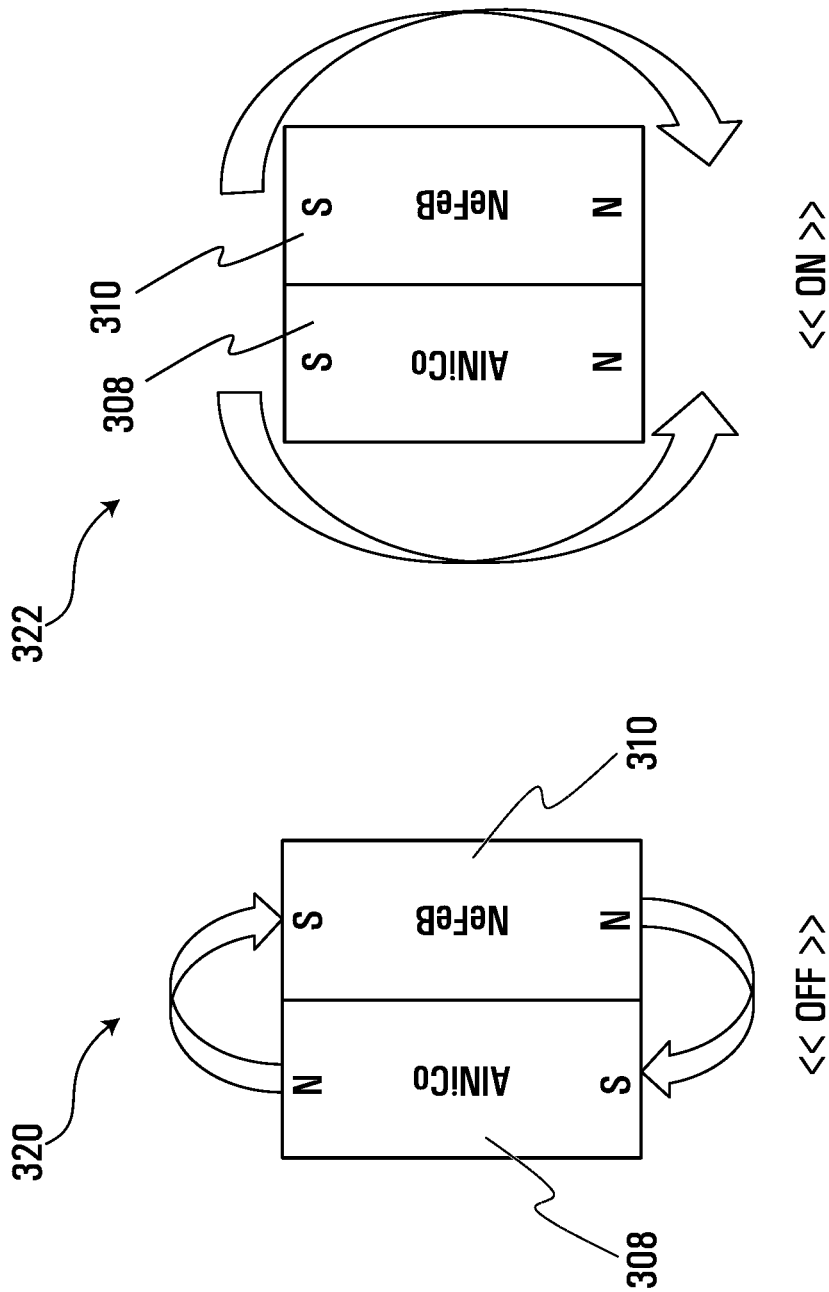
FIG. 3B presents the magnetic fields produced by an electropermanent magnet of the electropermanent actuator of FIG. 3A, when magnetized to produce an "on" state and an "off" state.
Figure 3C:
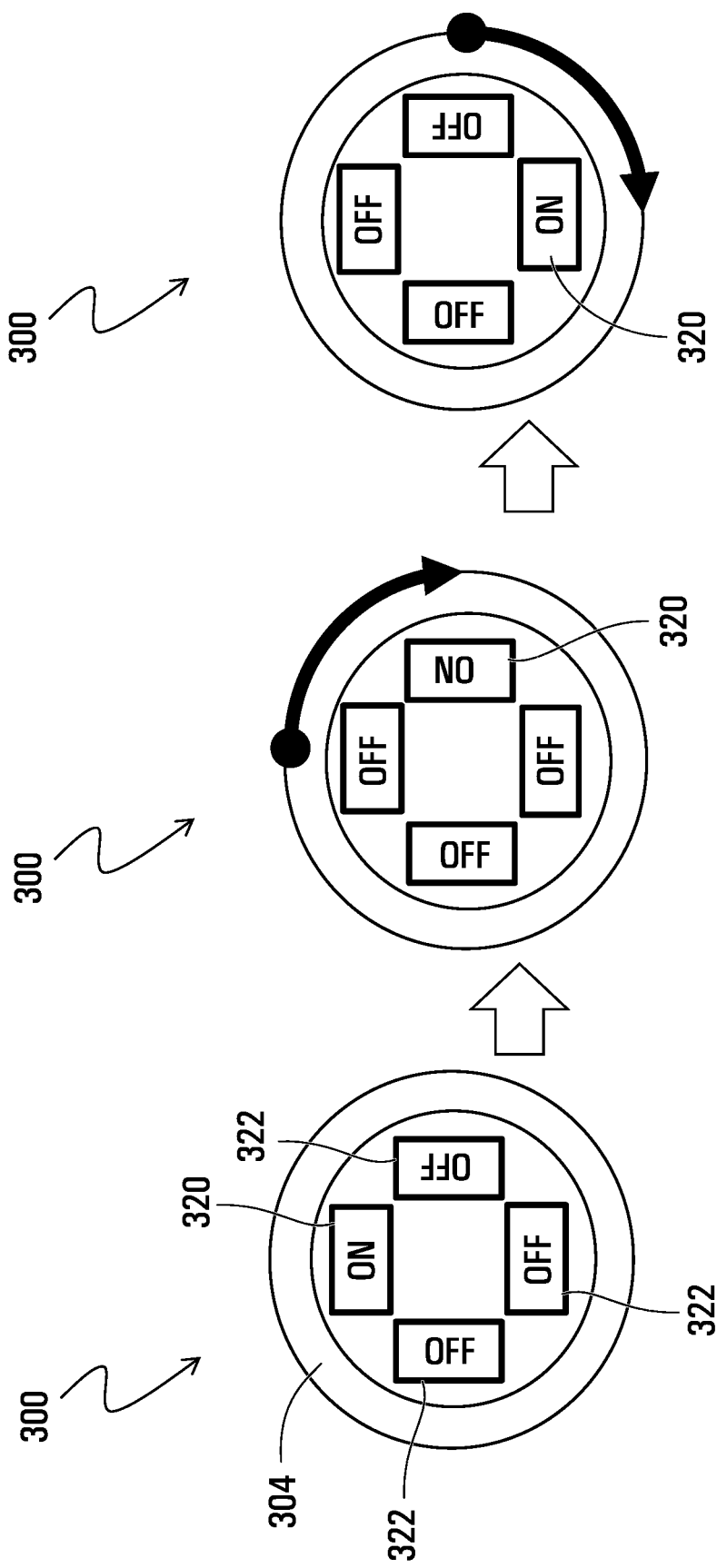
FIG. 3C presents schematic representation of the rotor of the electropermanent actuator of FIG. 3A rotating around the configuration of electropermanent magnets as they sequentially produce an "on" state.

Applicant has found that a single permanent magnet can be "programmed" using a strong pulse of current in a coil that will change the permanent magnetization of the permanent magnet in a motor. It will be appreciated that such a single permanent magnet can replace, for example, pairs of magnets 308,310 of the prior art FIG. 3B to provide a motor of the type shown in FIGS. 3A and 3C. It will also be appreciated that element 304 of the motor 300 can be replaced with a body having a ferromagnetic material element that is attracted to the magnetic field of the single permanent magnet arranged in a configuration as shown in FIG. 3C. Reprogramming of the single permanent magnets can cause the ferromagnetic element attracted to the permanents magnets to move as desired. In this way, the actuator does not need to rely on an interaction between two magnetized bodies, but instead one body that is magnetized and another that is of a ferromagnetic material.

Figure 4:
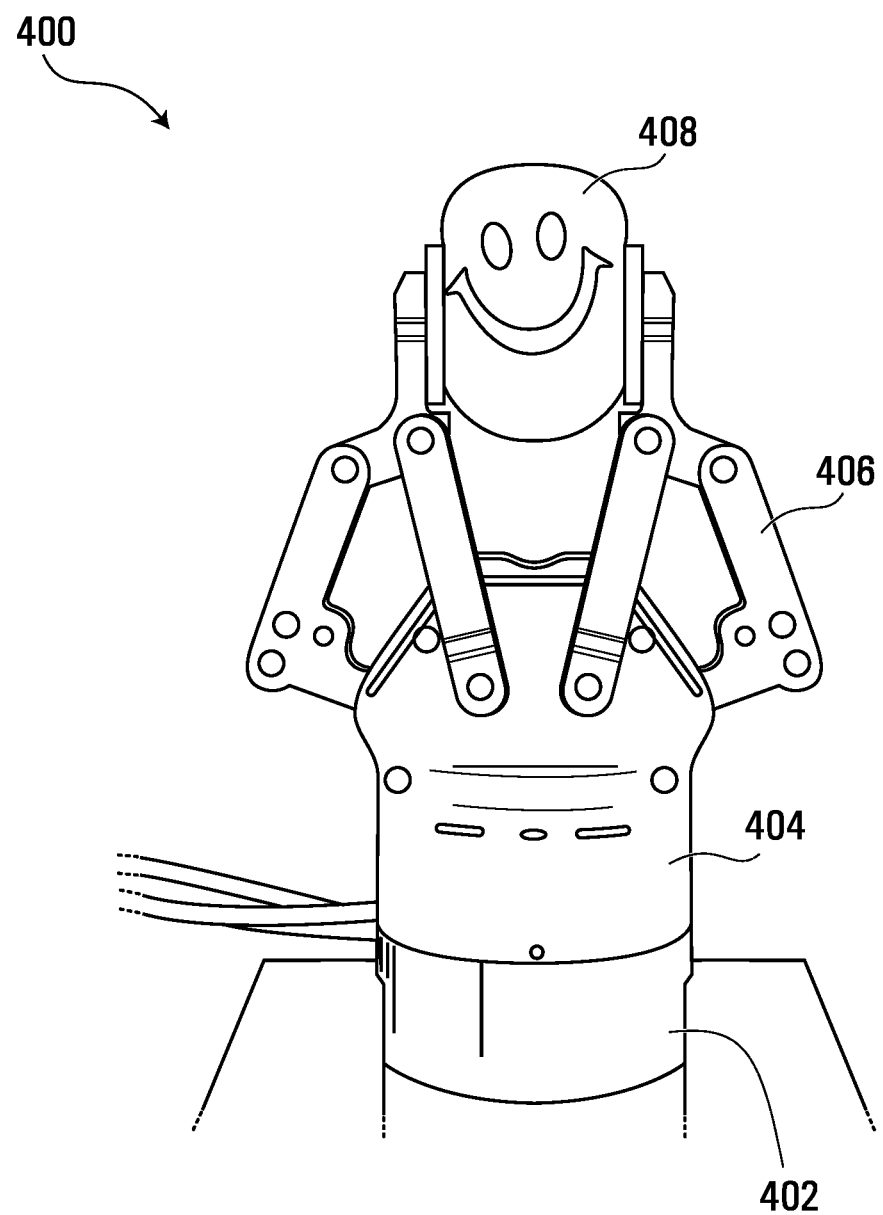
FIG. 4 presents a front view of a two-finger gripper having a programmable permanent magnet (PPM) actuator, according to one embodiment.

Presented in FIG. 4 is a robotic hand 400 having a base housing 402, a finger support body 404 and a pair of actuatable fingers 406, according to one embodiment. As can be seen, the finger support body 404 is mounted on the base housing 402 and is adapted to support the actuatable fingers 406. The base housing 402 is adapted to receive therein a "Programmable Permanent Magnet" (PPM) actuator system 500, as concurrently presented in FIG. 5A. The PPM actuator 500 is adapted to operate a drive shaft 508 and when connected to the actuatable fingers 406 is capable of generating enough torque to open and close the pair of actuatable fingers 406 of the robotic hand 400, allowing it to grasp various objects 404, such as a stress ball 404, and maintaining a grasp with a suitable torque for an extended period of time by only consuming energy to initially position the actuatable fingers and to initially control the desired torque to be applied.

PPM Actuator

Figure 5A:
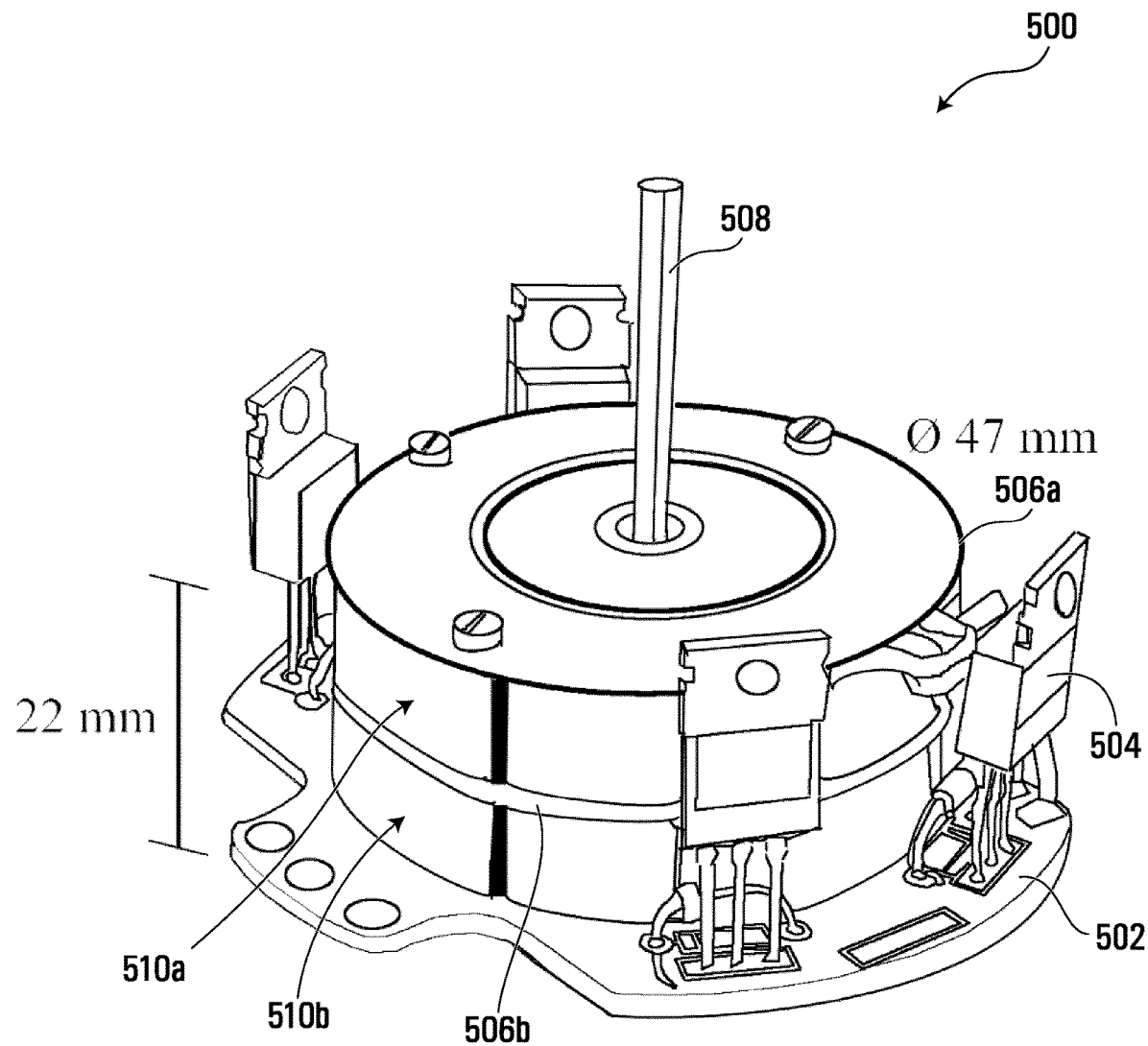
FIG. 5A presents a perspective view of the PPM actuator of FIG. 4, according to one embodiment.
Figure 5B:
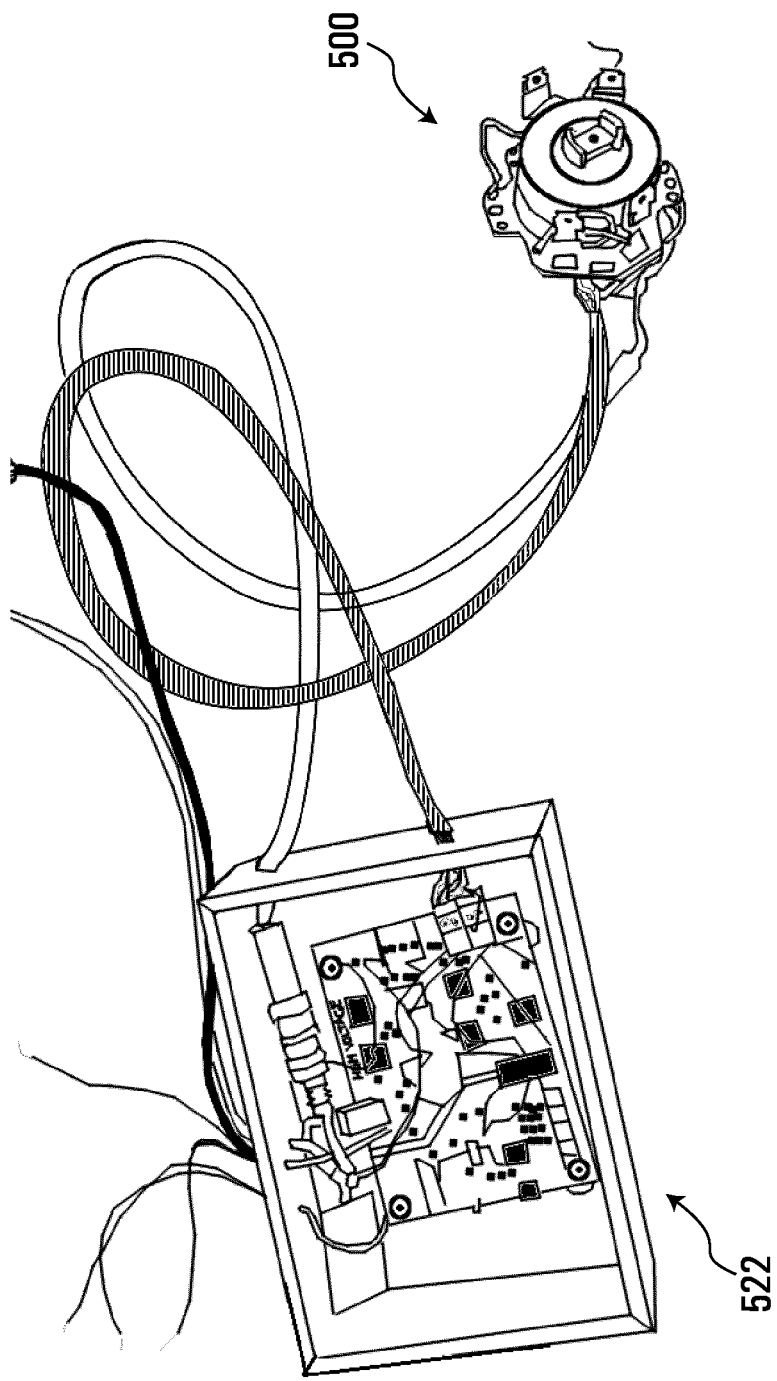
FIG. 5B presents a top view of the PPM actuator of FIG. 5A connected to a control module, according to one embodiment.

Further presented in FIG. 5A and concurrently presented in FIGS. 5B and 6A according to one embodiment, the PPM actuator 500 is connectable to a control module 522 that is adapted to control the PPM actuator 500.The actuator 500 has a main printed circuit board (PCB) 502, pulse switches 504, two intermediate PCBs (506a and 506b) and a rotary system 600 housed in casings (510a and 510b). The rotary system 600 is adapted to control a drive shaft 508 according to control instructions provided by the control module 522. The main PCB 502 is connectable to the control module 522 and the control module 522 is adapted to activate at least one of the pulse switches. When activated, the pulse switches 504 are adapted to provide necessary current pulses to an associated intermediate PCB (506A or 506b) with a power that is strong enough to change a stator magnet magnetization of the rotary system 600 according to a desired shaft 508 orientation and torque to be produced by the shaft 508.

Presented in FIG. 6A, according to one embodiment, the rotary system 600 has a first rotary layer 602a and a second rotary layer 602b that are concentrically aligned with respect to the drive shaft 508. Each layer has a rotor (604a and 604b) or a first body and a stator (606a and 606b) or a second body. Both rotor (604a and 604b) and stator (606a and 606b) are composed of permanent magnets and the orientation and torque of the rotor permanent magnets (604a and 604b) respond to the magnetic field produced by the stator permanent magnets (606a and 606b). According to one embodiment, each of the stator permanent magnets (606a and 606b) is adapted to create a respective torque function with the rotor (604a and 604b).

Depending on the application the permanent magnet is a ferromagnetic material having a suitable level of hardness. According to one embodiment, the permanent magnet is any kind of ferromagnetic material having an intrinsic coercivity (Hci) value that is greater than 200 kA/m and a remanence (Br) value that is greater than 0.4 Tesla, as will be further explained below in reference with FIG. 11B. In another embodiment, the permanent magnet has an intrinsic coercivity (Hci) value that is greater than 250 kA/m. In yet another embodiment, the permanent magnet has a remanence (Br) and intrinsic coercivity (Hci) ratio (Br/Hci) that is greater than 1.6.

Figure 5C:
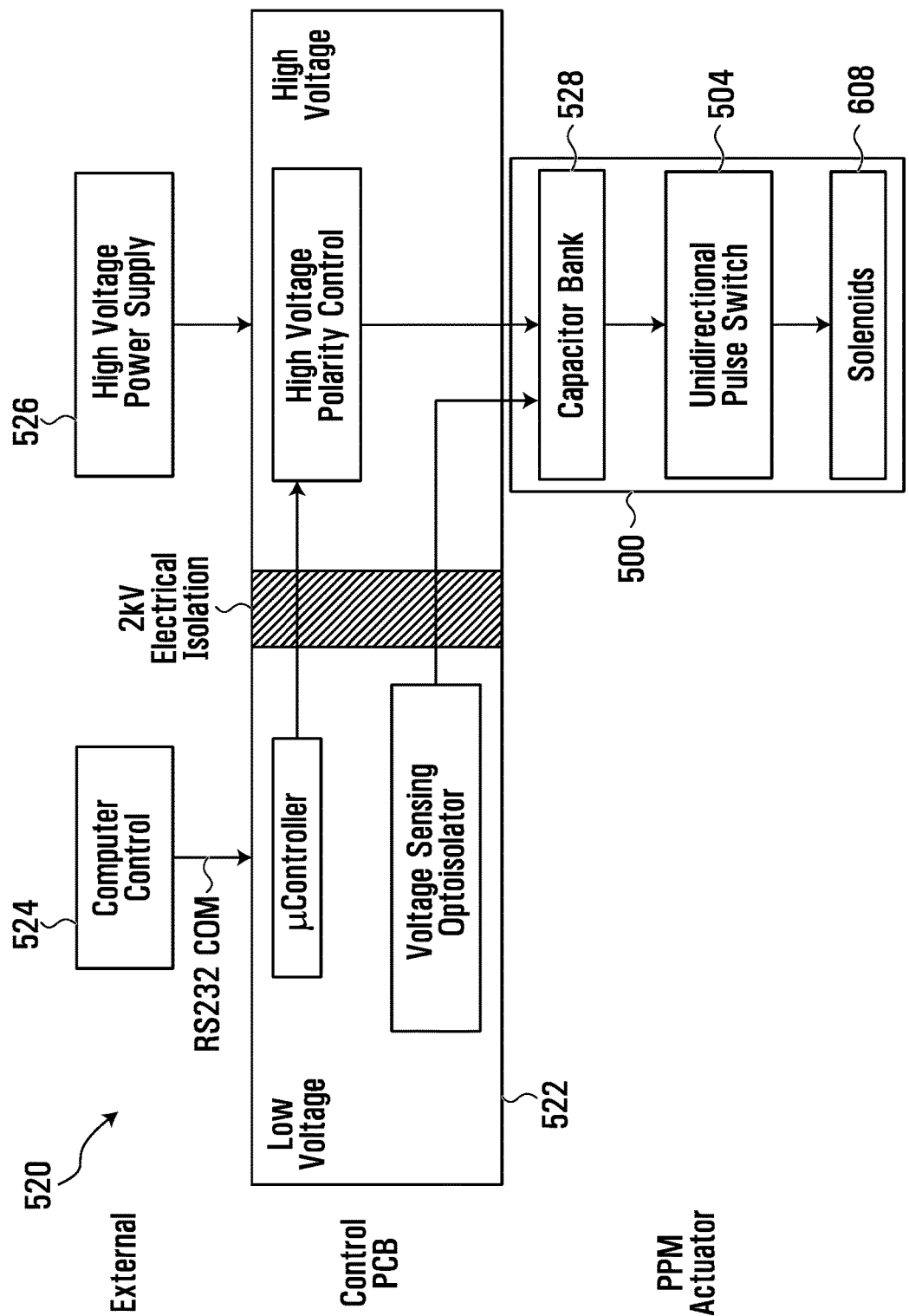
FIG. 5C presents a schematic diagram of system components to power and control the PPM actuator of FIG. 5A, according to one embodiment.

According to one embodiment, a control system 520 or a controller is adapted to control the PPM actuator 500, as schematically presented in FIG. 5C. The control system 520 has the control module 522 that is connected to a computing device 524 and a power supply 526. The computing device 524 is adapted to calculate and transmit command signals to the control module 522, according to a desired rotational movement and torque to apply by the shaft 508. The computer device 524 transmits the command signals using a communication protocol such as an RS-232 communication protocol to a microcontroller. According to the received command signal the control module 522 applies an adapted magnetization control current to the PPM actuator 500. The magnetization control current, such as a hundred sixty Amperes (160 A) current, is stored in capacitors 528 of the main PCB 502. The pulse switches 504 transfer the stored current as pulse currents to solenoids of the stator magnets 608 in order to change the magnetization of the stator magnets 608 and produce the desired rotational movement of the shaft 508 and the desired torque to apply by the shaft 508. Following the transfer of the required pulse currents to the solenoids, the change in polarity or magnetization is maintained by the stator magnets and the orientation and the torque in the shaft 508 is maintained without necessitating additional pulse currents or power. When used with a robot such as a with a robotic gripper 400, as presented in FIG. 4, only an initial current pulses is required to position the fingers 406 and provide an adequate torque to pinch and hold various items such as the stress ball 404 for a prolonged period of time or until another set of pulse currents are applied to the stator magnets 608.

Notice that the solenoids are magnetic field generation devices that are each associated to one of the stator magnets 608. The solenoids are controlled to generate controlled magnetic fields in proximity with each respective associated stator magnets 608. It is the controlled magnetic fields of the solenoids that modifies a magnetization of the associated magnets 608 such as to produce a required magnetic field in order to produce the desired rotational movement of the shaft 508 and the desired torque to apply by the shaft 508.

According to one embodiment, modifying a magnetization of the associated magnets 608 produces a change in reluctance (or magnetic resistance) to influence the associated magnetic flux circuit (e.g. the magnetic flux path, shape or intensity) in order to produce a required magnetic field to produce the desired rotational movement of the shaft 508 and the desired torque to apply by the shaft 508.

Halbach Array

Figure 7A:
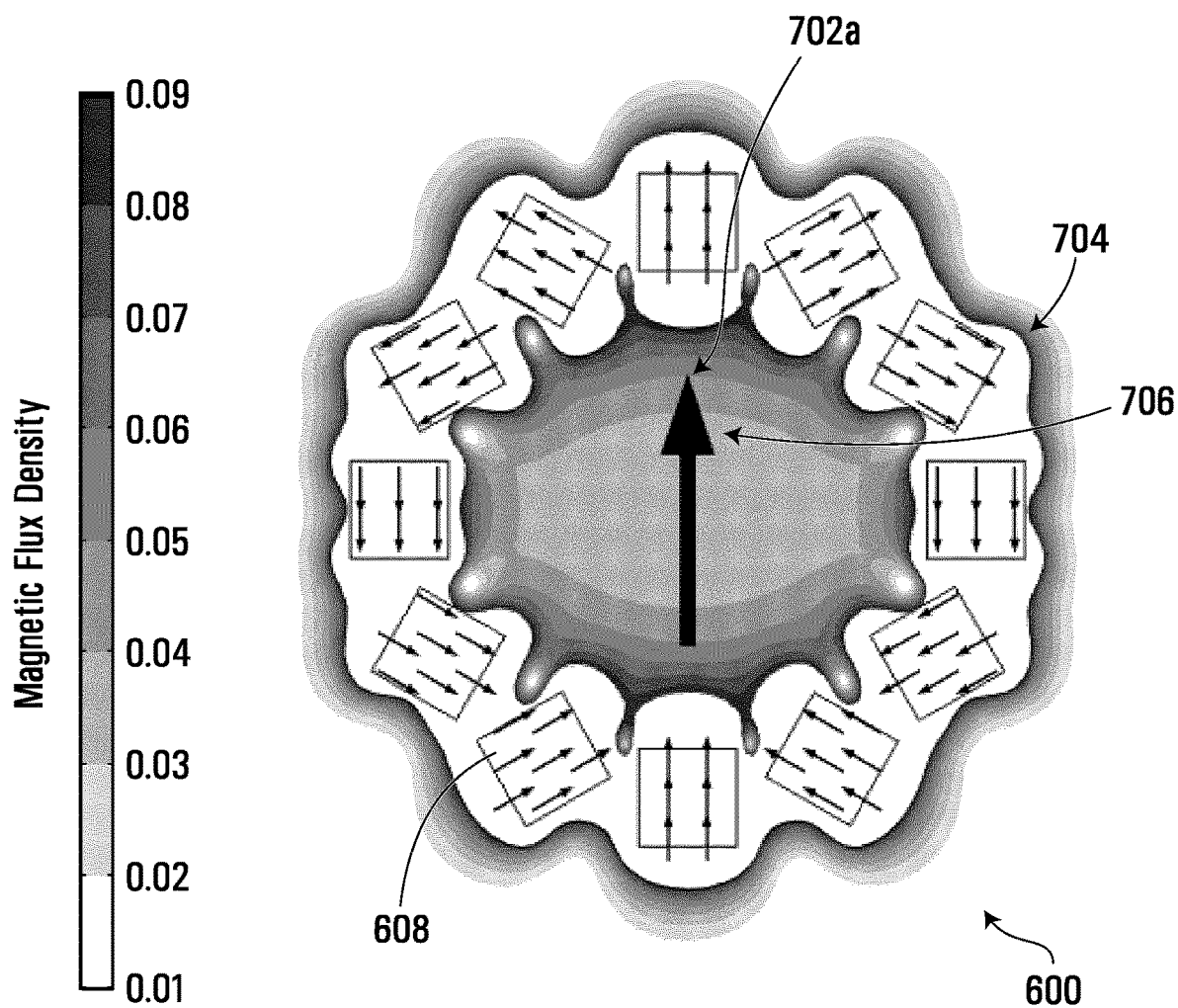
FIG. 7A presents a schematic top view of an FEA (Finite Element Analysis) magnetostatic simulation of the magnetic flux density norm in the Halbach array of the magnet arrangement presented in FIG. 6, according to one embodiment.
Figure 7B:
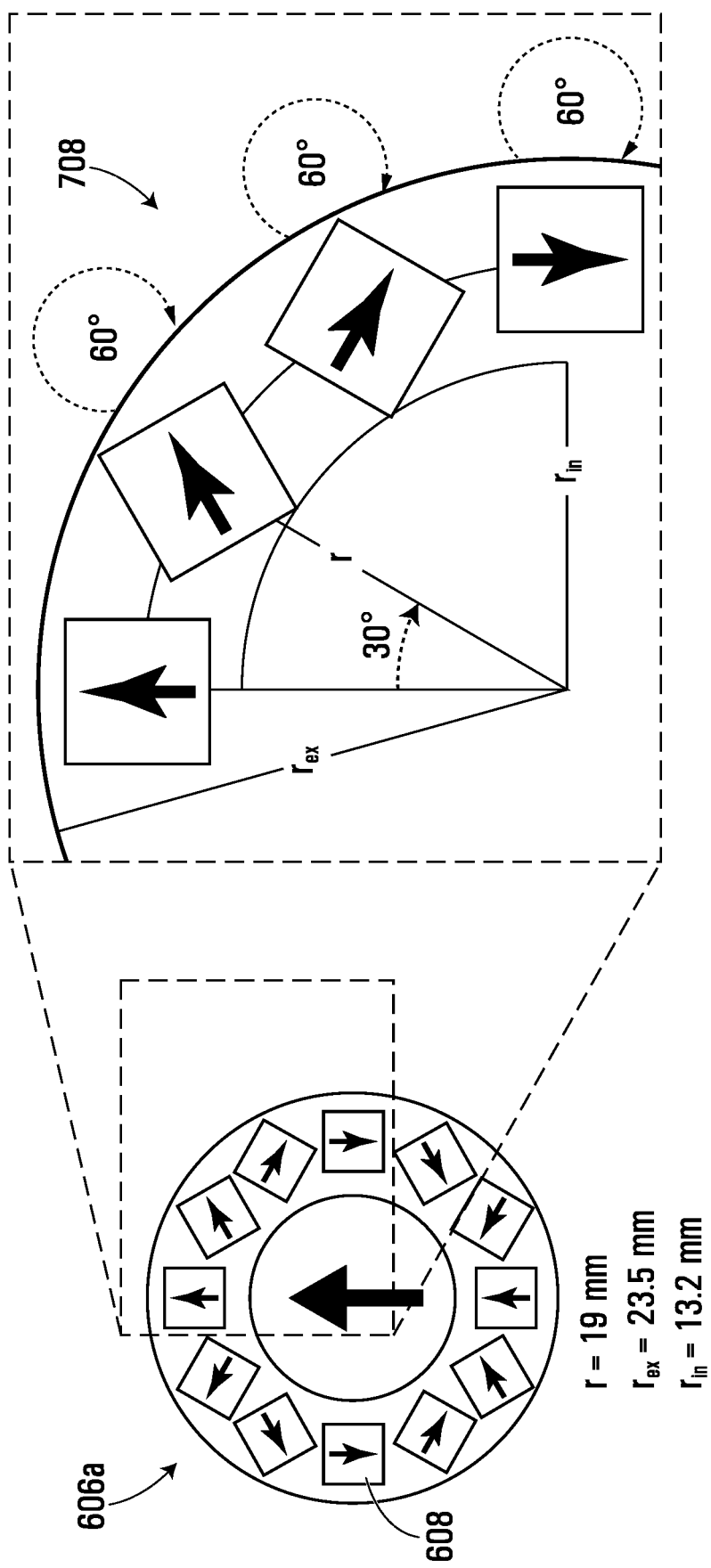
FIG. 7B presents a schematic top view of the positioning of the magnets in the Halbach array of the magnet arrangement presented in FIG. 6, according to one embodiment.
Figure 7C:
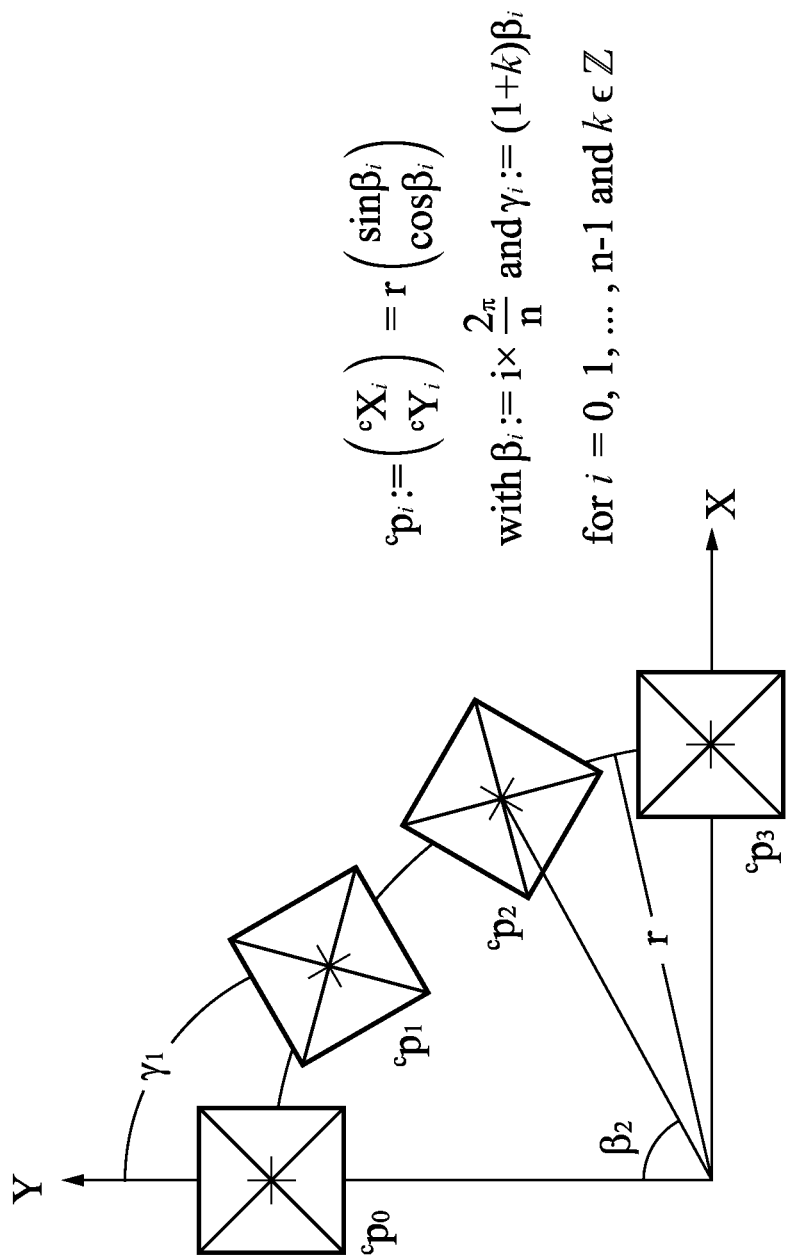
FIG. 7C presents a Halbach array equation in order to determine a Halbach magnet positioning and orientation with a schematic of a quarter of a Halbach array with n=12 and k=1, according to one embodiment.

According to one embodiment and as presented in FIGS. 7A, 7B and 7C, the stator magnets 608 are placed in a Halbach Array arrangement of K=1. This Halbach Array arrangement of magnets 608 allows to focus the magnetic field produced by the magnets 608 in a core region of the stator and reduce magnetic flux leakage at a peripheral region of the stator, even when the strength of the magnetic field is increased. This embodiment uses a Halbach Array arrangement of K=1, according to the Halbach Array magnet positioning and orientation equations presented in FIG. 7C. As can be noticed from FIGS. 7A and 7B, each magnet 608 is magnetized to produce a magnetic field that is oriented with a sixty degree) (60° shift.

With reference to the equations of FIG. 7C, the vector position $p_i$ of the equation describes the positions of the centers of the $i^{th}$ among n magnets in a circular Halbach array of radius r. The position of each magnet depends on the number of magnets used. Thus $\beta_i$ describes the angles between the $i^{th}$ magnets centers and the Y-axis from the presented Cartesian coordinates. The magnets orientation is described by $\gamma_i$ between the same Cartesian Y-axis and the magnets own reference axes.

FIG. 7A presents the stator (606a and 606b) being controlled to produce a magnetic field having a positive Y-axis direction. As can be noticed, the magnetic flux density (e.g. magnetic field) produced by the controlled stator (606a and 606b) has an annular shape having a relatively lower-density magnetic flux distributed at a peripheral region 704 of the rotary system 600. However, there is a relatively higher-density directional magnetic flux at a core region 706 of the rotary system 600. The lower-density magnetic flux at the peripheral region 704 advantageously limits magnetic field interference with other electronic components. The higher-density magnetic flux at the core region 706 depicts the directional properties of the produced magnetic field. In FIG. 7A, the stator (606a and 606b) is controlled to produce a magnetic field that has a positive Y-axis direction and the magnetic flux at the core region 706 has a greater density distribution regions. The orientation of the rotor (604a and 604b) is thereby controlled by the magnetic field produced by the stator (606a and 606b). However, the is controlled by the combination of the magnetic field produced by the stator (606a and 606b) with the magnetic field produced by the permanent magnet of the rotor (604a and 604b).

According to one embodiment, the lower density of the magnetic flux produced by the stator (606a and 606b) at the periphery region 704 is controlled by a combined effect of the magnetization of each stator magnet 608. FIG. 7B depicts a stator magnet arrangement 708 of one of the stator layers (606a and 606b). According to one embodiment, the stator magnets 608 are positioned in the casing (510a and 510b) according to a Halbach array arrangement 708, as presented in FIG. 7B. The stator magnets 608 are positioned in a ring-like arrangement 708 and each stator magnet has a magnetization that is sequentially shifted by sixty degrees (60°), such as in a "k=1" Halbach array arrangement 708, as represented by the Halbach magnet equations of FIG. 7C that indicates a positioning and orientation (or magnetic field orientation) of each magnet of the arrangement 708.

Figure 7D:
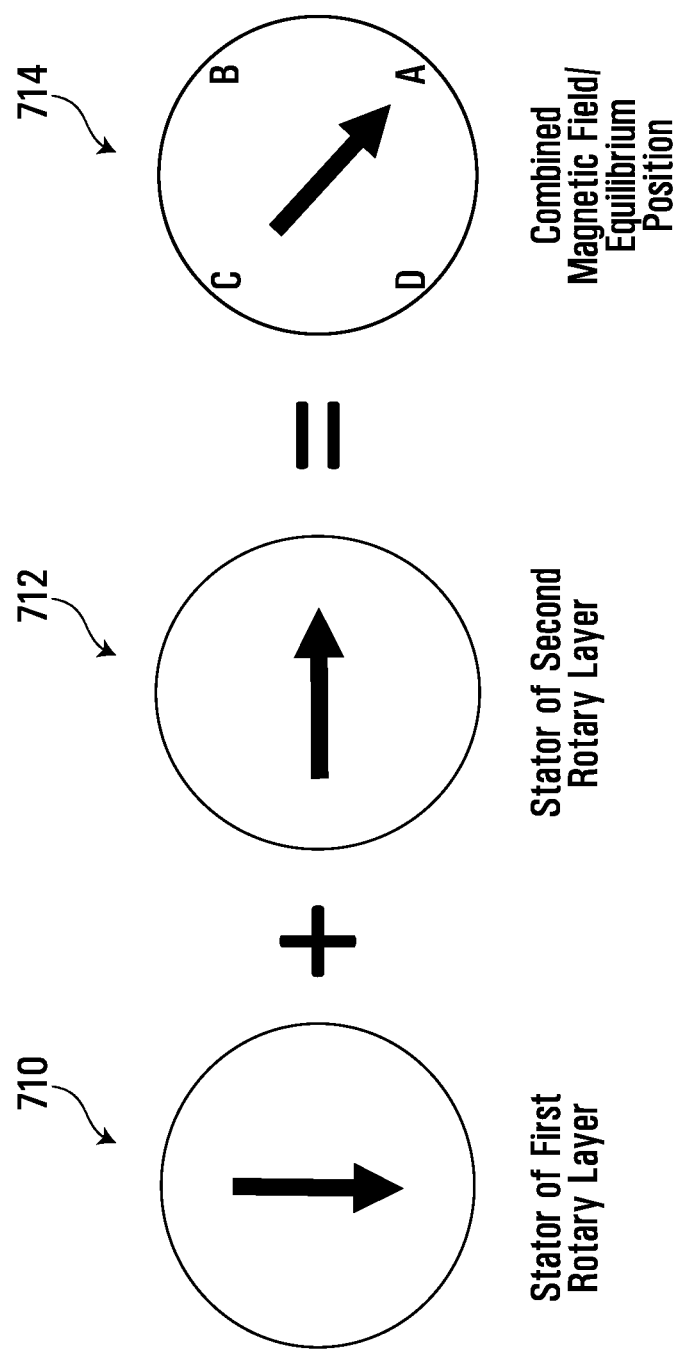
FIG. 7D is a schematic representation of a combined effect of the magnetic fields produced by the two stator layers on the rotor of the PPM actuator of FIG. 5A, the combined effect of the magnetic fields provides to the rotor an equilibrium position and a controlled elastic torque, according to one embodiment.

The stators of the first rotary layer 602a and the stators of the second rotary layer 602b are each controlled by a corresponding intermediate PCB (506a and 506b) to produce a combined effect on the drive shaft 508, as illustrated in FIG. 7D. According to one embodiment, the rotary system 600 has the first stator layer 606a being controlled to produce a magnetic field that has a first magnetic field 710 and the second stator layer 606b being controlled to produce a magnetic field that has a second magnetic field 712. The combined magnetic flux amplitude produced by the two stator layers (606a and 606b) rotates the rotor in an equilibrium position 714 that is the vector sum of the two magnetic field vectors 710 and 712 (e.g. position A). Notice that the rotor also has a secondary equilibrium position as identified as position "C". As further depicted by the associated torque graph 716, a torque produced by the combined magnetic field produced by the stator levels (606a and 606b) and the rotor (604) increases up to positions "B" and "D". The rotor (604a and 604b) permanent magnets are thereby forced to rotate in position "A" 714 and apply a controlled torque according to the torque graph 716, as concurrently presented in FIG. 8.

In this embodiment, each rotor (604a and 604b) is a hollow cylindrical magnet that is made of high-grade ferromagnetic material (such as N42 NdFeB) and is magnetized diametrically. The rotors (604a and 604b) are concentrically aligned with respect to the drive shaft 508 and define a gap such as a 4.25 mm gap. Each rotor (604a and 604b) has the following dimensions: 25.4 mm (1") in diameter, with a hollow center of 3.175 mm (0.125") in diameter, and height of 6.35 mm (0.25").

It shall be recognized that any other suitable type of permanent magnet adapted to be diametrically magnetized, adequately resisting demagnetization and operatively providing a desired torque can be used as the rotor (604a and 604b) magnet, without departing from the scope of the present PPM actuator 500.

In this embodiment, each stator (606a and 606b) is composed of a plurality of stator magnets 608. The stator magnets 608 are positioned in a Halbach array configuration and connected to their respective intermediate PCB (506a and 506b). The stators (606a and 606b) are concentrically aligned with respect to the drive shaft 508 and define an adequate gap there between to prevent magnetic flux from one rotary layer 602a to influence the magnetic flux of the other rotary layer 602b, and vice versa. For instance, in FIG. 6, the stators 606a and 606b are superposed one on top of the other and provide a 4.25 mm gap. The stator magnets 608 are fixedly positioned in their respective casings (510a and 510b) with flat bearings and non-conductive screws. Each stator magnet 608 is made from a Samarium-Cobalt magnet that is wrapped in two layers of wire coil forming a solenoid. In this embodiment, the wire has an American Wire Gauge of thirty (AWG30) wire (N≈32 where N is the number of turns). The solenoids are wired in a serial manner and for manufacturing simplicity, each solenoid is wired independently and soldered or connected to its respective intermediary PCB (506a and 506b).

According to one embodiment, the electrical characteristics of the stator magnets 608, as measured at 1 kHz by an LCR meter (Inductance L, Capacitance C and Resistance R) such as the LCR meter 878B Model from B&K Precision Corporation, are:

$$\begin{cases} L_s \approx 7.2 \ \mu H \\ R_s \approx 0.29 \ \Omega \end{cases} \begin{cases} L_H \approx 88 \ \mu H \\ R_H \approx 3.5 \ \Omega \end{cases}.$$

It shall be recognized that any other type of permanent magnet suitably wrapped with wiring, having a controllable magnetization and that is yet resistant to demagnetization while operatively providing a desired torque can be used as the stator 608 magnets, without departing from the scope of the present PPM actuator 500.

It shall further be recognized that any other suitable stator magnet 608 configuration is possible as long as it is capable of producing with the rotor a desired amount of torque on the shaft 508 that is under a load and maintaining the torque only by applying initial current impulses to the PPM actuator 500. The initial current impulses being adapted to adequately modify the magnetization of the stator magnets. Such a stator magnet 608 configuration shall operatively allow controlling an orientation of the shaft 508 and maintaining a fixed orientation or elastically fixed orientation (e.g. torque) of the shaft 508 while applying an initial limited amount of current impulses to the PPM actuator 500.

Figure 9:
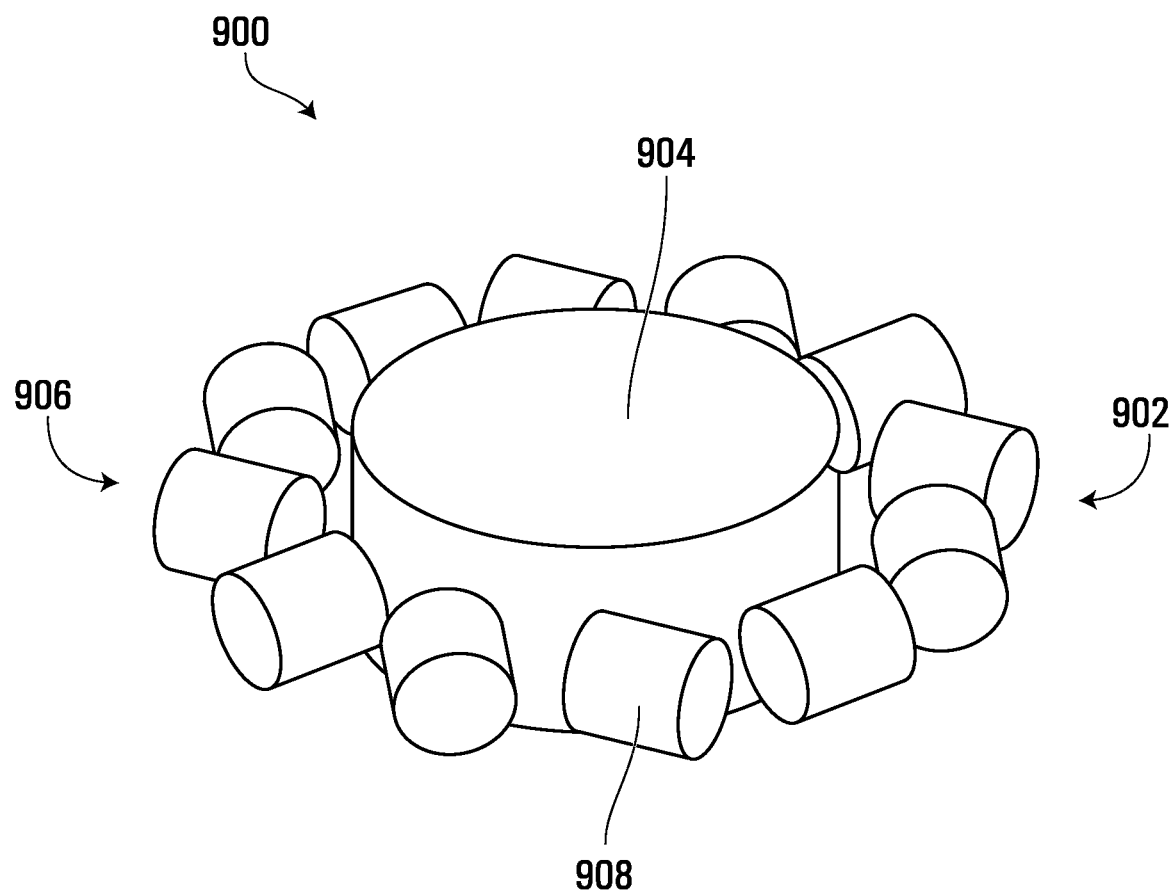
FIG. 9 presents a perspective view of a single level Halbach array arrangement of magnets of the PPM actuator of FIG. 5A, according to an alternate.

For instance, FIG. 9 presents the PPM actuator 500 having a rotary system 900 with only a single layer 906. The single layer 906 has a rotor 904 and a stator system 902 of magnets 908. The stator magnets 908 are controlled to produce a combined magnetic field and influence the rotational movement of the rotor 904. The rotational movement and torque of the rotor 904 are also influenced by the combined effect of the magnetic field of the stator magnets 908 and the magnetic field produced by the rotor 904 itself. It shall however be recognized that the control of the torque may be greater with the PPM actuator 500 having a plurality of stator and rotor layers, such as two, three or more layers. However, in some applications where a precise torque control is not required or where an actuator space is limited, the single layer rotary system 900 may be beneficial. According to one embodiment, the precision of the rotor's rotation movement and the torque provided by the rotor is increased according to the number of rotary layers.

Figure 10A:
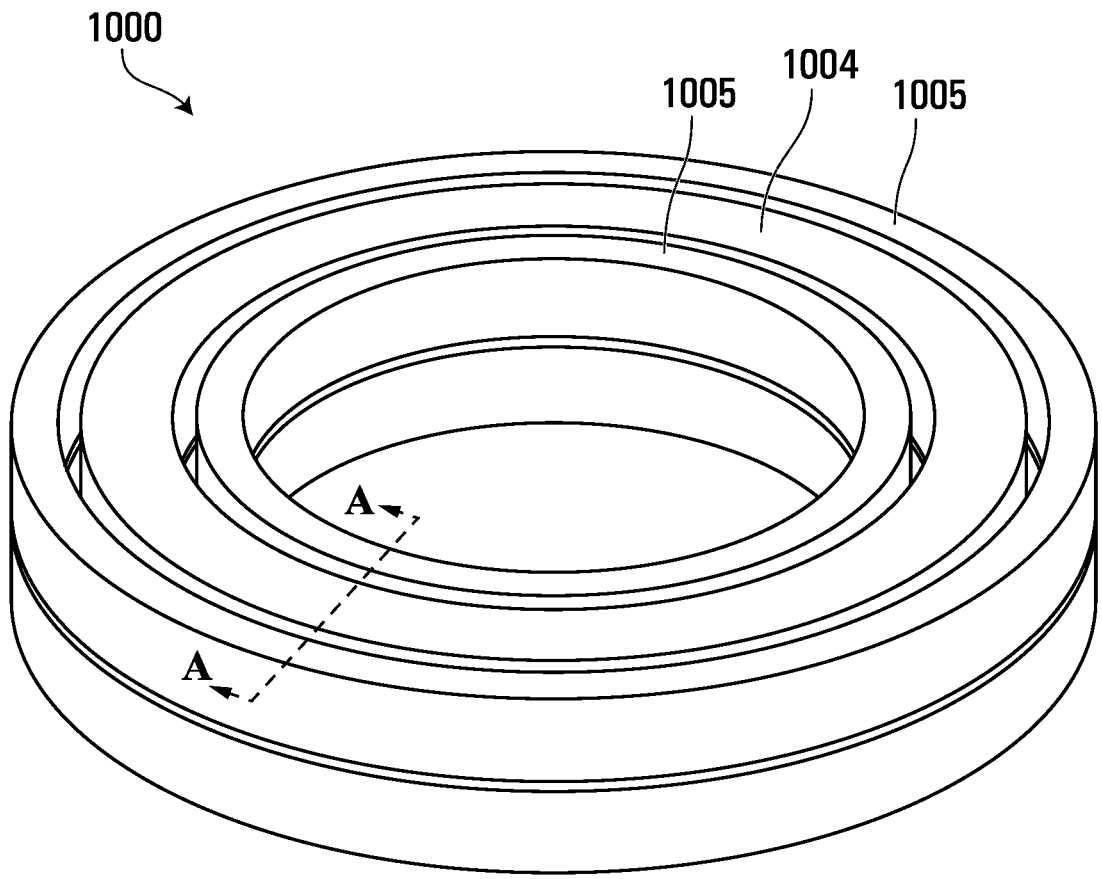
FIG. 10A presents a perspective view of a superposed stator magnet and rotor magnet arrangement of the PPM actuator of FIG. 5A, according to an alternate embodiment.
Figure 10B:
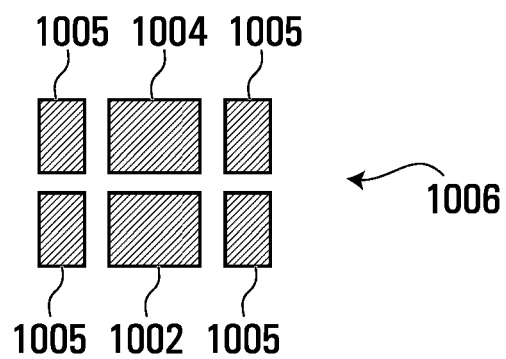
FIG. 10B presents a perspective view of a superposed stator magnet and rotor magnet arrangement of the PPM actuator of FIG. 5A, according to an alternate embodiment.

In an alternate embodiment, as presented in FIG. 10A, the PPM actuator 500 has a rotary system 1000 having a stator ring 1002 and a rotor ring 1004 that are superposed. The cross sectional view 1006 taken along lines A-A of the rotary system 1000, presents the stator ring 1002 being positioned below the rotor ring 1004 with a space there between. The controlled magnetic field produced by the stator ring influences a rotation or a position of the rotor ring 1004 and a torque applied by the rotor ring 1004. According to one embodiment, in order to confine the magnetic field produced by the stator ring 1002 and also by the magnetic field produced by the rotor ring 1004, iron rings 1005 are positioned at an exterior periphery and at an internal periphery of the rotary system 1000. In this embodiment the stator ring 1002 is a single ring shaped magnet. However, it shall be recognized that the single ring shaped magnet can be divided in any suitable number of magnets that are differently magnetizable.

Figure 10C:
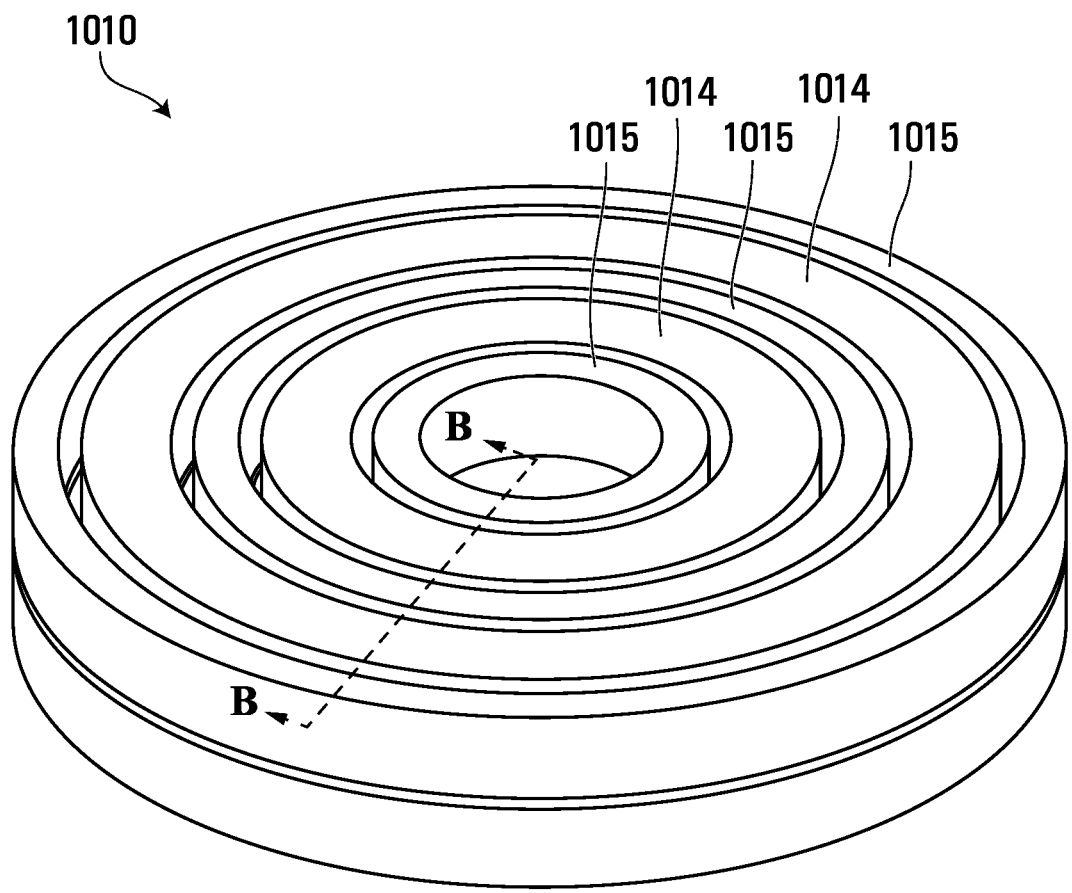
FIG. 10C presents a perspective view of a superposed stator magnet and rotor magnet arrangement of the PPM actuator having a rotary system having two concentric stator rings and two concentric rotor rings that are superposed, according to an alternate embodiment.
Figure 10D:
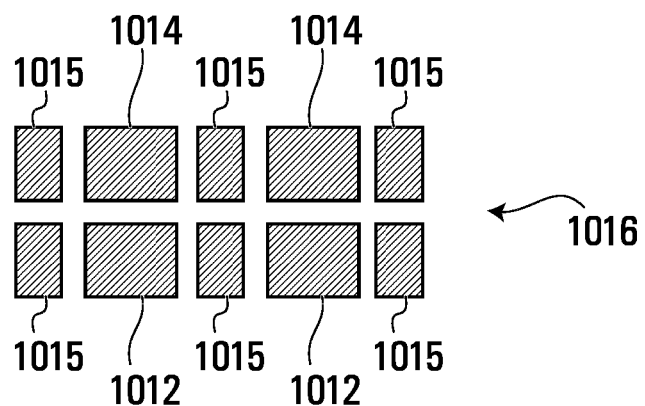
FIG. 10D presents a perspective view of a superposed stator magnet and rotor magnet arrangement of the PPM actuator of FIG. 10C.

It shall be further recognized that any part of the rotary system may be composed of any suitable number of rings along the radial axis. For instance, according to an embodiment as presented in FIG. 10C, the PPM actuator 500 has a rotary system 1010 having two concentric stator rings 1012 and two concentric rotor rings 1014 that are superposed. The cross sectional view 1016 taken along lines B-B of the rotary system 1010, presents the stator rings 1012 being positioned below the rotor ring 1014 with a space there between. The controlled magnetic field produced by the stator rings influences a rotation or a position of the rotor rings 1014 and a torque applied by the rotor rings 1014. In order to confine the magnetic field produced by the stator rings 1012 and also by the magnetic field produced by the rotor rings 1014, iron rings 1015 are positioned at an exterior periphery, at an internal periphery of the rotary system 1010 as well as between each of the stator rings 1012 and each of the rotor rings 1014. In this embodiment the stator ring 1012 is a single ring shaped magnet. However, it shall be recognized that the single ring shaped magnet can be divided in any suitable number of magnets that are differently magnetizable.

System Operation

Returning to FIG. 5C, according to one embodiment, the bank of capacitors 528 provides a total capacitance of 15.24 µF and includes forty-two ceramic StackiCap 2220-1K20224-X-WS2 capacitors each having a capacitance of 0.22 µF, and two film capacitors MKP1847 each having a capacitance of 3 µF. The capacitors 528 are connected to discharge and change the polarity of the stator magnets 608 with the unidirectional pulse switch 504 such as a solid state switch (thyristor).

The PPM actuator 500 is capable of sustaining and maintaining a variety of torques for an indefinite period of time without necessitating additional current or power. For a given torque, the motor's energy consumption is directly proportional to its rotational speed (velocity). According to one embodiment, the complete PPM actuator 500 with capacitors 528 weighs about two-hundred (200) grams.

According to one embodiment, the capacitors are ceramic capacitors since ceramic capacitors are capable of storing approximately ten times more energy per unit of volume than the Vishay film capacitors, and are easier to fit inside a given space. However, in other actuators used in applications where safety, over-voltage resistance, or peak current capability are critical factors, film capacitors such as the Vishay film capacitors may be better suited.

Two Layer Halbach Magnetic System

Figure 6:
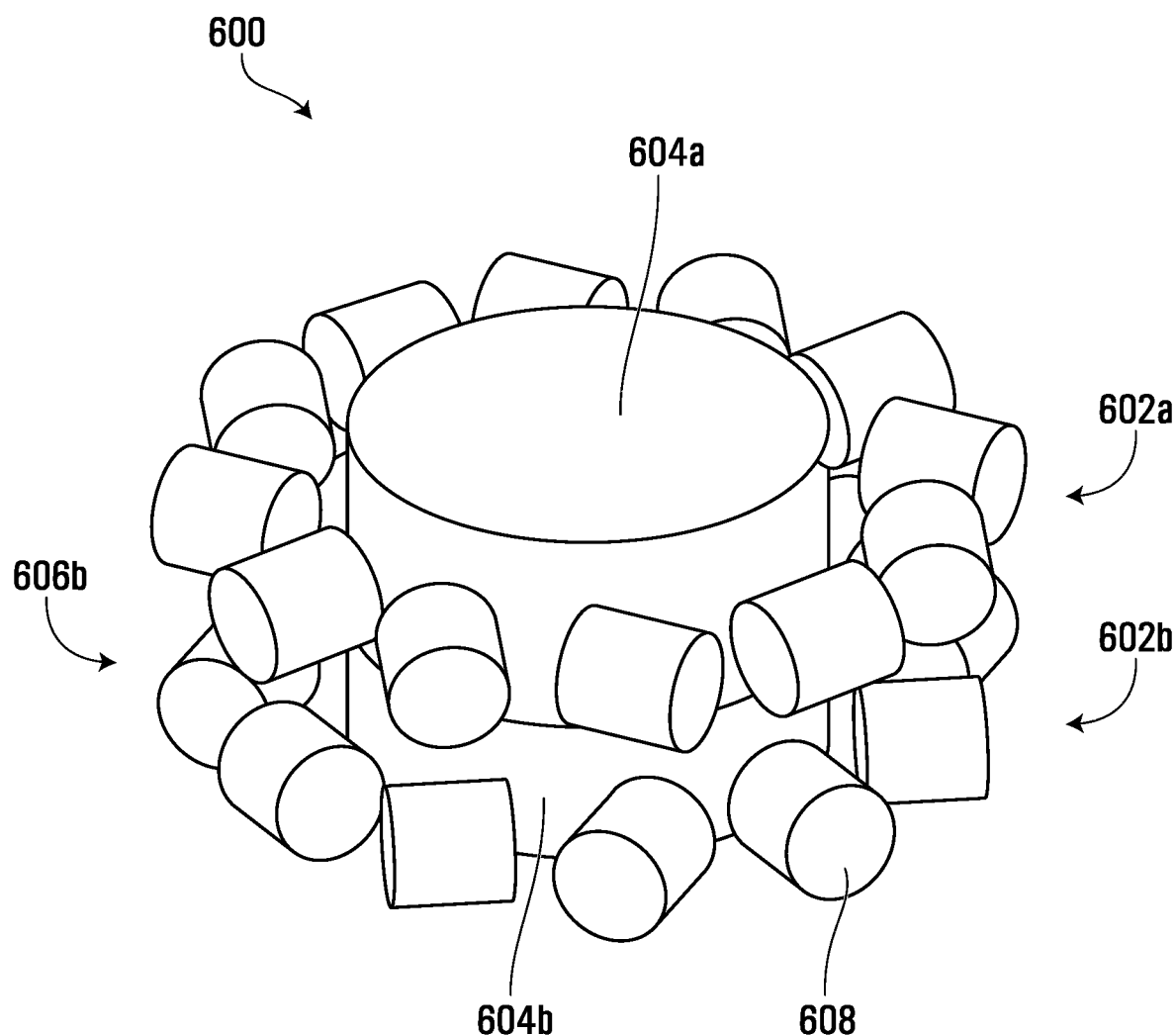
FIG. 6 presents a perspective view of a two level Halbach array arrangement of magnets of the PPM actuator of FIG. 5A, according to one embodiment.

Presented in FIG. 6, according to one embodiment, the stator magnets 608 are positioned to form two layers of Halbach arrays that are concentrically aligned with respect to the shaft 508, with a shifted angle of 90 degrees between each layer. This bipolar configuration allows to produce a desired torque (within the actuator or gripper 406 range) in any orientation, and to have the motor rotate in any direction.

As illustrated in FIG. 7B, the Halbach arrays of stator magnets 608 allows to focus the magnetic flux of individual stator magnets 608 to create one stronger magnetic field on only one side of the array. FIG. 7B presents a schematic top view of a finite element analysis (FEA) magnetostatic simulation of the magnetic flux density norm (T) in one Halbach array, according to one embodiment. By focusing all the field in the core region 706 of the stator (602a or 602b), the Halbach array minimizes loss of the magnetic field outside the actuator 500, which also comes with the benefit of minimizing noise that may be induced in nearby devices such as sensors.

The number and direction of magnetic poles within the Halbach array depend on the magnets' configuration. In one case, a Halbach array (K=1) that creates a unique magnetic pole pair with near-uniform flux within the center of the stator is used, according to the equation of FIG. 7C.

A passive Halbach array in configuration K=1 produces a torque function that follows a sinusoid, which can be used to statically balance a single degree of freedom like a pendulum. Many dynamic systems follow a near-sinusoid function, such as the torque about the elbow joint of an industrial robotic manipulator. Such a near-sinusoid torque function matches some robotic applications. In this case, the resulting PPM actuator 500 requires less energy since its torque can be adjusted less frequently, and less drastically, than would be the case if the torque function did not match the application at all.

According to one embodiment, in order to increase the strength of the generated magnetic field, a greater amount of magnetic material for a given volume of the PPM actuator 500 or casings (510a and 510b) is determined. Consequently, a distance between each magnet of the rotor (604a and 604b) and stator (602a and 602b) is reduced. According to one embodiment, relatively short magnets are used in the stator (602a and 602b) according to the Halbach array configuration, in order to increase the number of magnets and magnetic material per unit of volume. According to one embodiment, custom-made magnets are used in the Halbach arrays. The magnets are cylinders of 6.35 mm (0.25") in diameter and height, which are magnetized through the length.

It shall be recognized that using discrete magnets in the stator creates a weaker magnetic field and more magnetic flux leakage than with a single magnet of continuously changing magnetization. However manufacturing and magnetization of discrete magnets can be more cost effective. Moreover mounting the discrete magnets in the actuator can be easier.

Figure 8:
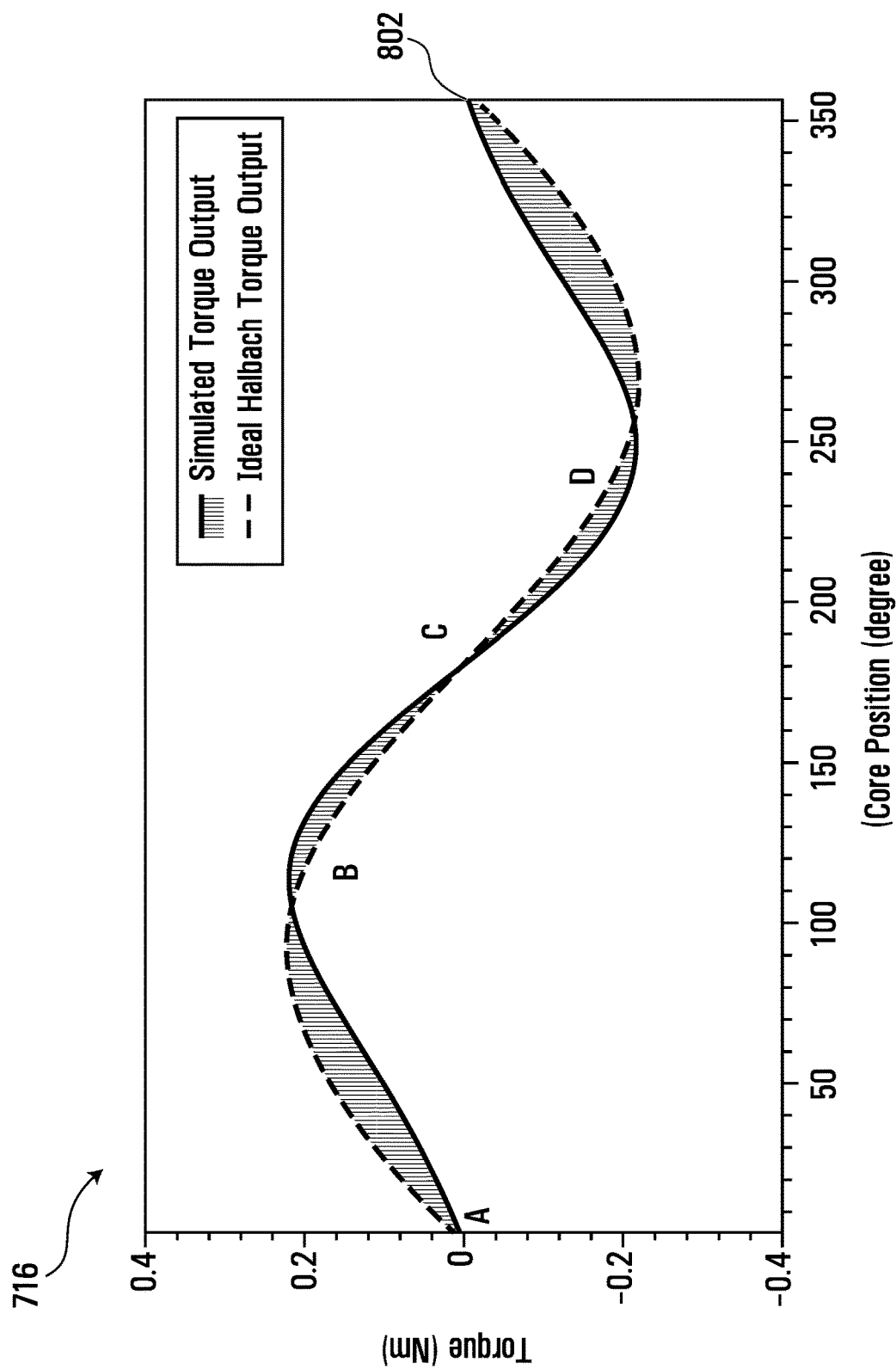
FIG. 8 presents a graph of a FEA torque function provided by the Halbach array of the magnet arrangement presented in FIG. 6, according to one embodiment.

Presented in FIG. 8 is a graph 716 illustrating a theoretical Halbach torque output and a simulated torque output of the rotary system 600 of FIG. 6. The magnetic flux density norm using a finite element analysis (FEA) software (Comsol Multiphysics) was used to simulate the torque output. The simulations allow to evaluate both the strength of the magnetic field within the Halbach array of magnets (602a and 602b), and the amount of magnetic flux that leaks out. The axial torque function is computed and compared to an ideal Halbach torque output. The motion of the magnets in the rotor 604 is simulated while the stator (602a and 602b) is fully magnetized. As can be noticed with the Halbach array configuration of magnets (602a and 602b), the ideal Halbach torque output is reached within one turn of the rotor magnets 604, at the three-hundred-sixty (360) degrees position 802.

Magnet Type

According to one embodiment, only one type of magnet is used, and the magnetization is changed via a pulse of current in the winding or solenoids of the stator magnets 608. This enables to "set" any amount of magnetization, in any direction, within the physical limits of the magnetic properties of the magnet.

One of the challenges with this approach is determining the right magnet to use for the stator. AlNiCo magnets, for instance, are easy to magnetize and require little energy to control. However, AlNiCo magnets have low coercivity and are easily demagnetized. They also have a low degree of effective remanence and can only weakly retain magnetic fields (i.e., they have difficulty retaining magnetic flux density). This produces a weak actuator, since a strong internal core will easily demagnetize the AlNiCo magnet(s). However, if the rotor magnet is a weak permanent magnet and the load applied to the drive shaft 508 is relatively low, a weak permanent magnet such as the AlNiCo magnet can be used for the stator, according to one embodiment.

Alternatively, some permanent magnets like the NdFeB magnets are not easily demagnetized by a strong permanent magnetic core, so they could enable a very strong actuator. However, the amount of energy required to program such a magnet is relatively high, making the NdFeB magnets an energy consuming solution. If the load applied to the drive shaft 508 is relatively high, a strong permanent magnet such as the NdFeB magnet can be used for the stator, according to one embodiment.

In an alternate embodiment, the stator magnet is determined according to an acceptable trade-off between a desired magnet's strength and the magnetization cost.

The maximum product of a magnet's coercivity and remanence ($BH_{max}$) is normally used to select magnets. However, since the stator magnet should be as powerful as possible while requiring relatively low energy to reprogram, the $BH_{max}$ is not a good indicator of a desirable stator magnet for the present actuator 500. The $BH_{max}$ is an approximate value of the theoretical maximum energy stored in the magnet, whereas stator magnets, according to one embodiment, require a combination of high remanence ($B_r$) and low intrinsic coercivity ($H_{ci}$).

Figure 11A:
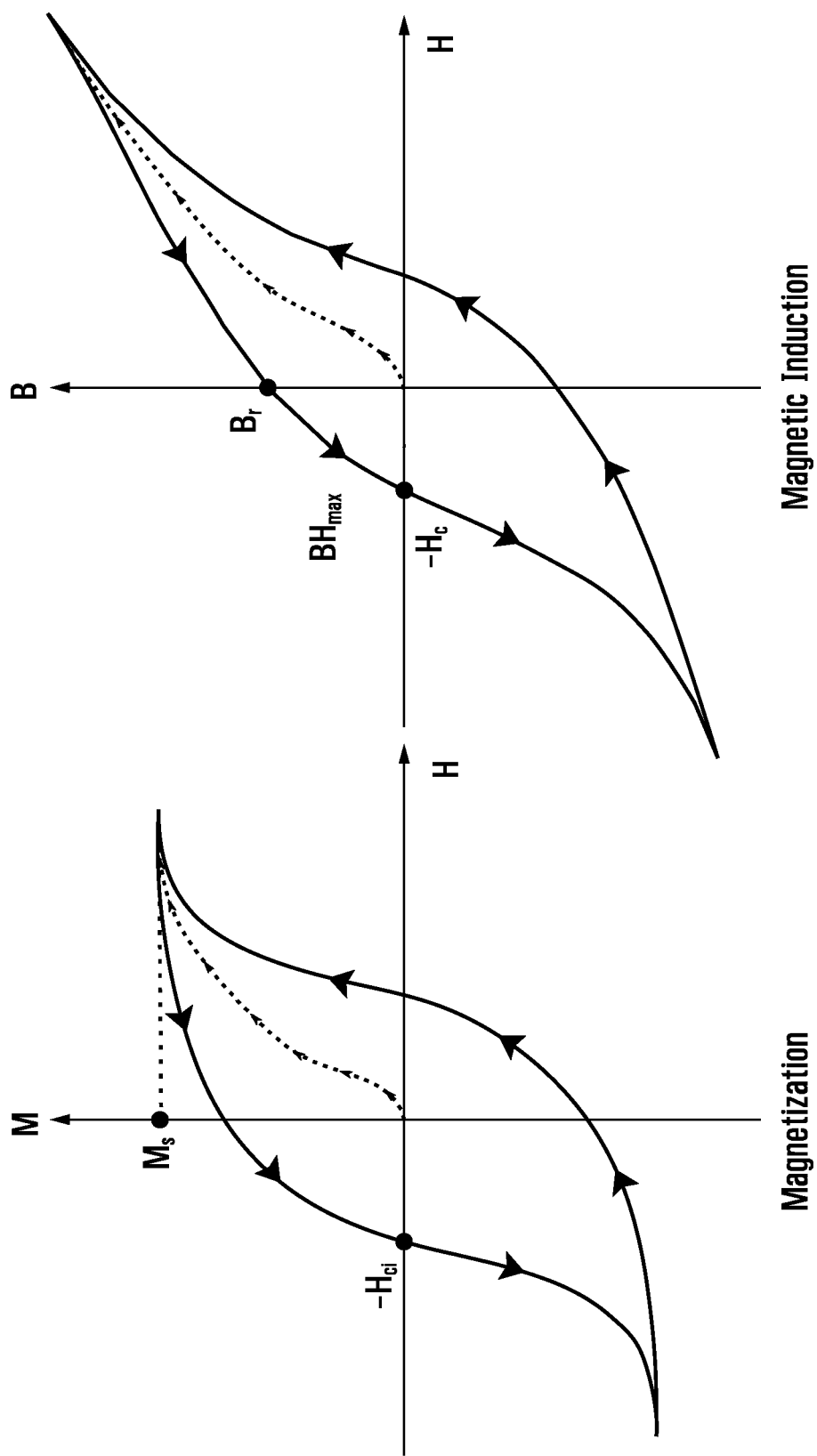
FIG. 11A presents typical ferromagnetic material hysteresis curves with independent scales.

As presented in FIG. 11A, the intrinsic coercivity ($H_{ci}$) of a magnet is an indicator of the necessary magnetizing field strength (H) to which the magnet must be subjected in order to completely lose its magnetization (M). The $H_{ci}$ is a good indicator of the energetic cost of magnetization of a given magnet. Although magnet coercivity ($H_c$) is more commonly used than $H_{ci}$, the former only corresponds to the magnetization field required to momentarily cancel a magnet's magnetic field, as opposed to the field required to permanently demagnetize it, which in some cases is far greater.

Figure 11B:
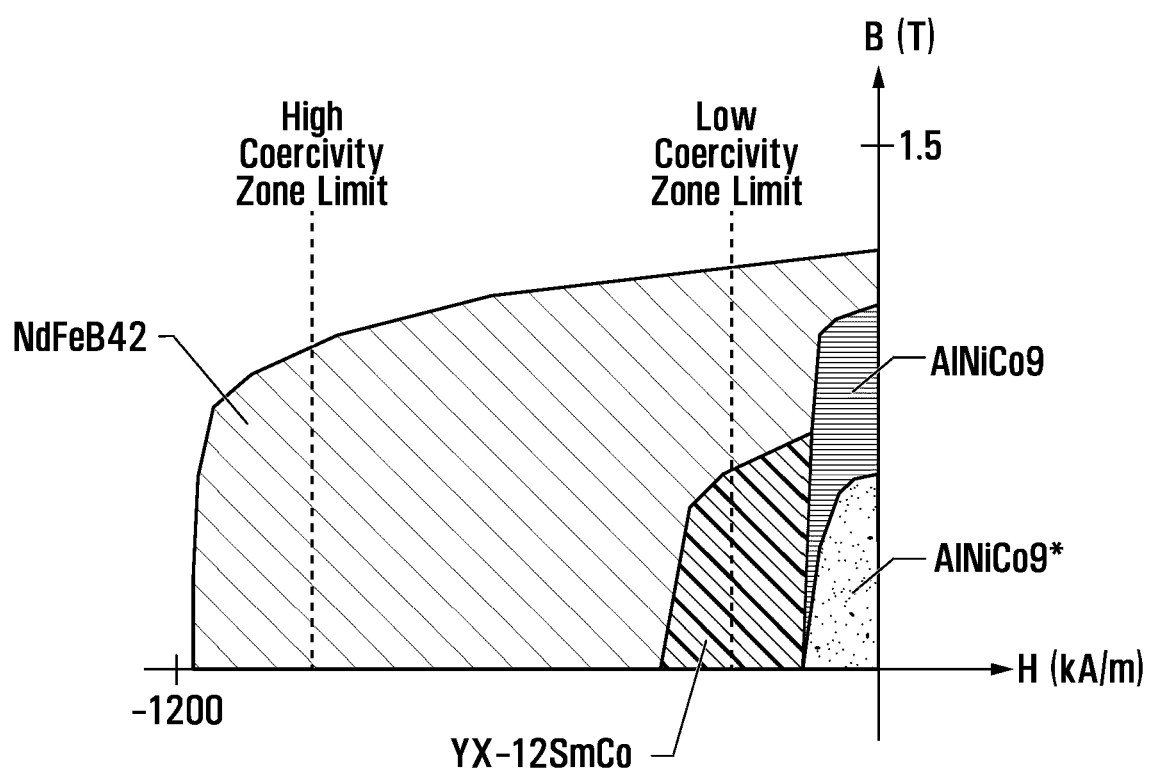
FIG. 11B presents the second quadrant of the BH curve for the NbFeb42, YX-12 SmCo, and AlNiCo theoretical and effective ferromagnetic materials.
Figure 12:
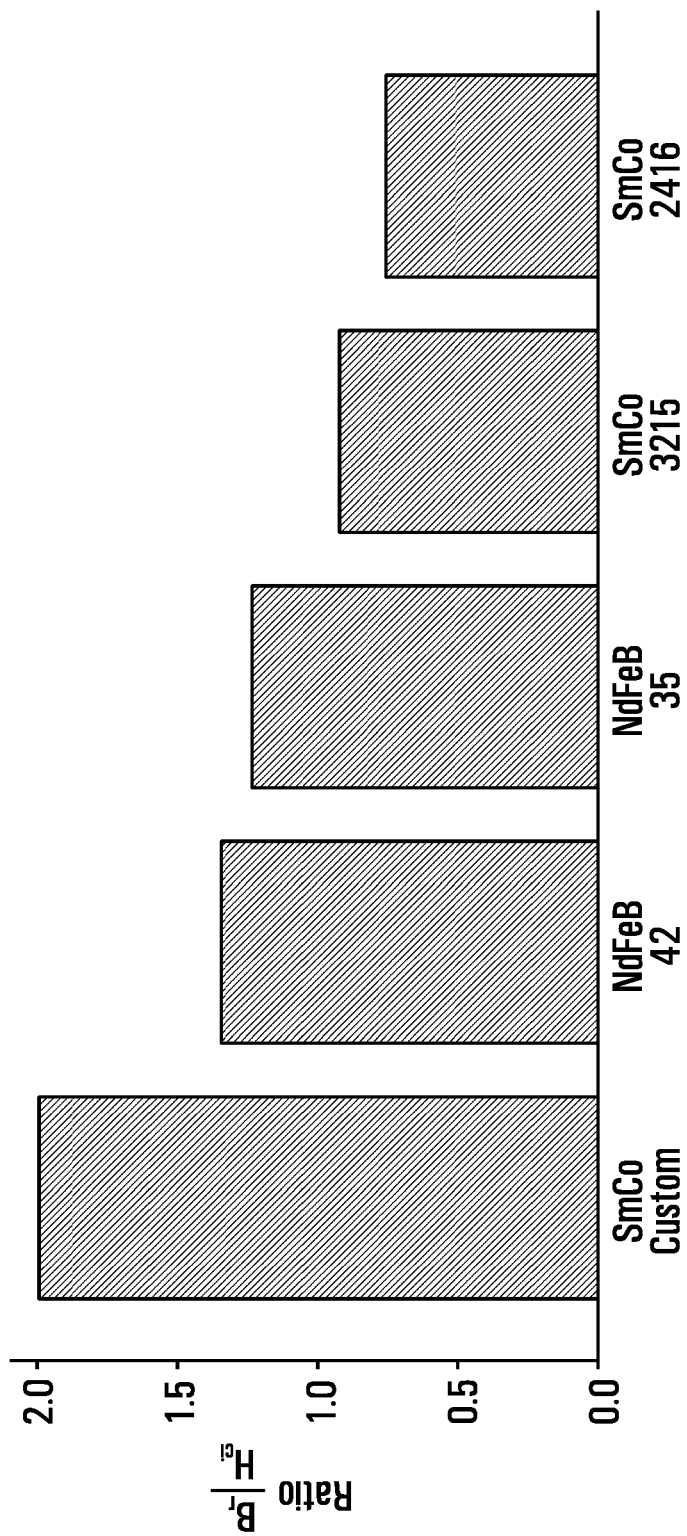
FIG. 12 presents a comparison of different ferromagnetic materials.

According to one embodiment, the criteria for selecting a stator magnet can be represented by the following function (Eq. 1):

$$\max f(x) = \frac{B_r}{H_{ci}},$$

subject to $H_{ci} \geq c$, where $B_r$ is expressed in mT (milli tesla), and $H_{ci}$ in kA/m (kilo ampere per meter), and where c is the minimum intrinsic coercivity required to avoid demagnetization by the core of the actuator or by the rotor permanent magnet. For instance, SmCo-grade magnets can present properties that maximize the equation Eq. 1. FIGS. 11B and 12 present graphs that show how custom-made SmCo magnets perform with respect to the function of Eq. 1, compared to other types of magnets. The intrinsic coercivity of the custom-made SmCo magnets (395 kA/m) is among the lowest of the SmCo magnet family, but is still several times higher than the intrinsic coercivity of any AlNiCo magnet while also producing an experimentally measured magnetic flux density of 0.723 Tesla.

Notice that the PPM actuator 500 can be less efficient at high speeds. Therefore, when using it with a transmission gear box, it may be preferable to use it for applications necessitating a relatively low ratio. According to one embodiment, the actuator 500 has a relatively high torque-to-volume ratio created by a strong magnetic field within the actuator and does not require a transmission gear box.

Torque Generation

In a conventional DC motor and in the present actuator 500, movement and torque are created by the interaction between two magnetic fields: one fixed magnetic field (a permanent magnet), and one variable magnetic field. However, whereas in the DC motor the variable field is a temporary electromagnetic field controlled by an electrical current, in the present actuator 500, both the fixed and variable components are permanent magnets. The magnetic field of one permanent magnet (stator magnet) is set to a desired value in order to create a desired motion of the other permanent magnet (rotor magnet) and thereby exert a desired torque.

To do so, the PPM motor 500 relies on current pulses to generate strong magnetic fields that will magnetize the hard ferromagnetic material of the windings. A skilled person will understand that hard and soft ferromagnetic materials are distinguished by their ability to retain magnetic fields: hard ferromagnetic materials are much more difficult to demagnetize than soft ferromagnetic materials. For example, see *Introduction to Magnetic Materials,* Second Edition, Wiley/IEEE, B. D. Cullity and C. D. Graham, First published:29 February 2008, Chapter 14 "Hard Magnetic Materials."

Figure 13:
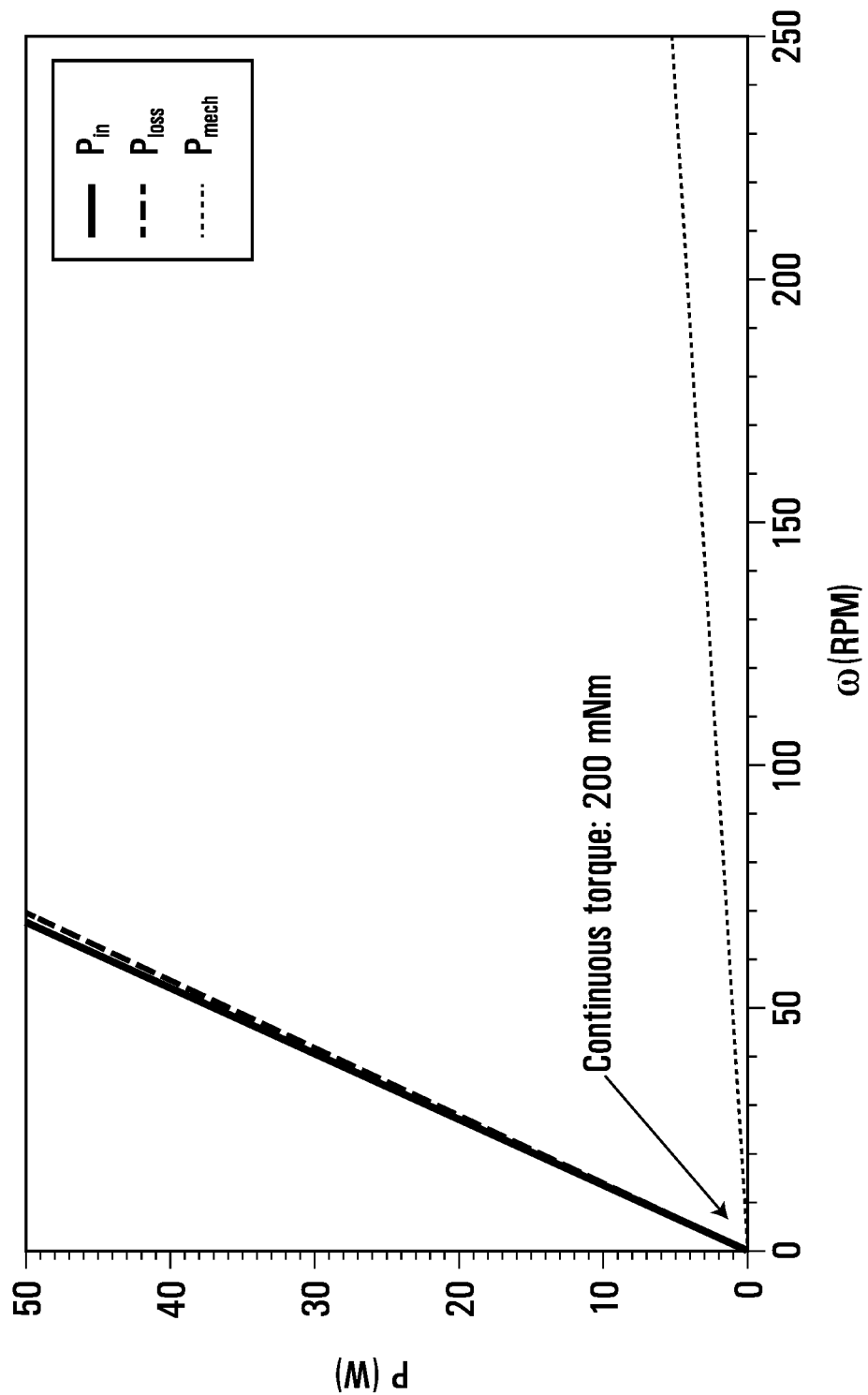
FIG. 13 presents the power characteristics of the PPM actuator of FIG. 5A, according to one embodiment.

In the PPM motor 500, the current is used to magnetize the stator magnets. The PPM motor then generates torque due to the interaction between the magnetic fields of the stator and rotor. Assuming the magnets are neither heated past their Curie temperature nor physically battered, and that the hard ferromagnetic material can sustain the opposing magnetic field, then the "set" torque can be maintained by the motor with no additional current and at no additional cost. The motor only requires power to switch the magnetic fields of its stator magnets, in order to rotate its drive shaft 508 as desired by applying adapted pulses of current through the respective solenoids associated to the stator magnets. Therefore, as shown in FIG. 13, the PPM motor's power input ($P_{in}$) is directly related to the number of these pulses ($N_p$) required to cause a single rotation, to the energy contained in each pulse ($E_p$), and to the actuator's angular velocity ($\omega$). So the PPM motor's consumption can be approximated with the following equation (Eq. 2):

$$P_{in} = \frac{\omega}{2\pi} N_p E_p.$$

As can be noticed from this equation (Eq. 2), the power consumed by the present actuator 500 is directly proportional to how quickly the motor rotates. The only other variable in this equation is the energy contained in each pulse $E_p$, since the number of pulses is fixed during the actuator design. According to one embodiment, the number of pulses is four ($N_p$=4). The amount of energy used in these pulses controls the strength of the generated magnetic fields, which results in distinct levels of torque. By adjusting the two variables $\omega$ and $E_p$, both the velocity and the torque produced by the actuator 500 are controlled.

Figure 1:
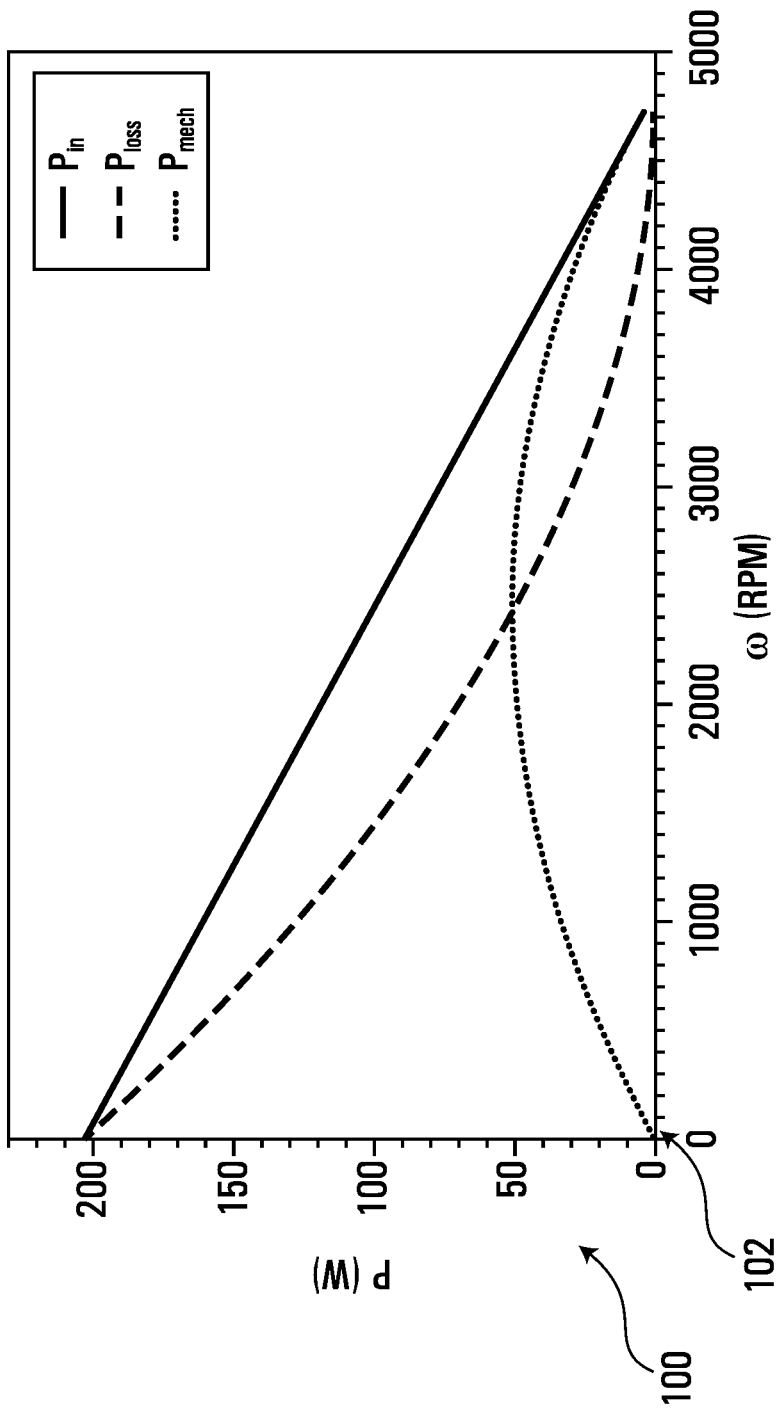
FIG. 1 presents power characteristics of a prior art conventional robot such a prior art Maxon brushless motor.
Figure 2A:
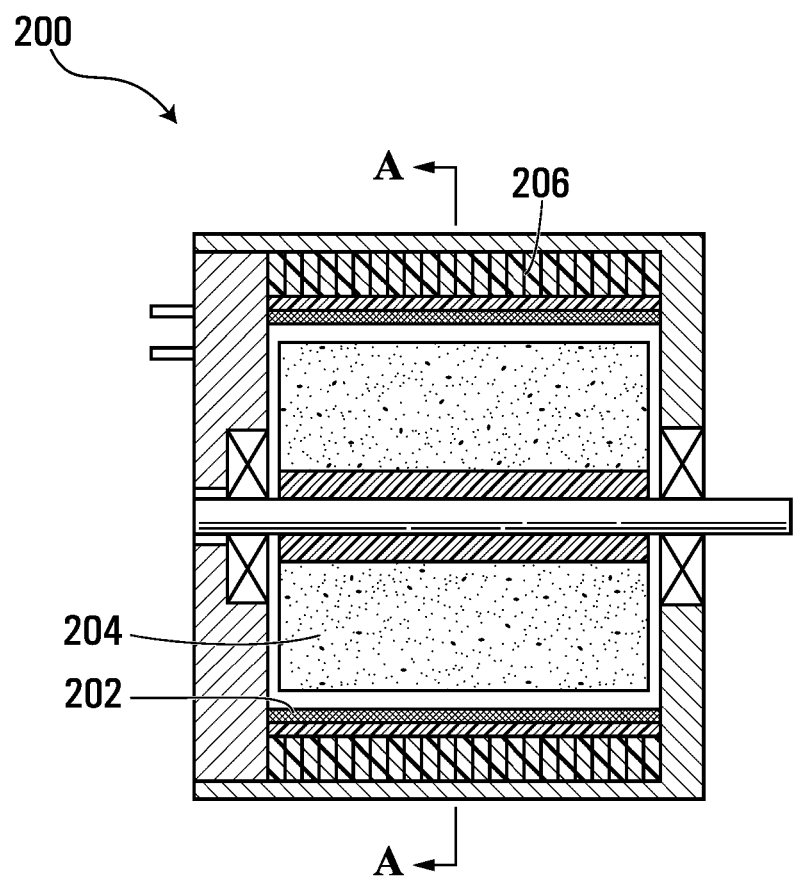
FIG. 2A presents a cross-sectional view of a prior art direct current (DC) brushless motor of which the power characteristics are presented in FIG. 1.
Figure 2B:
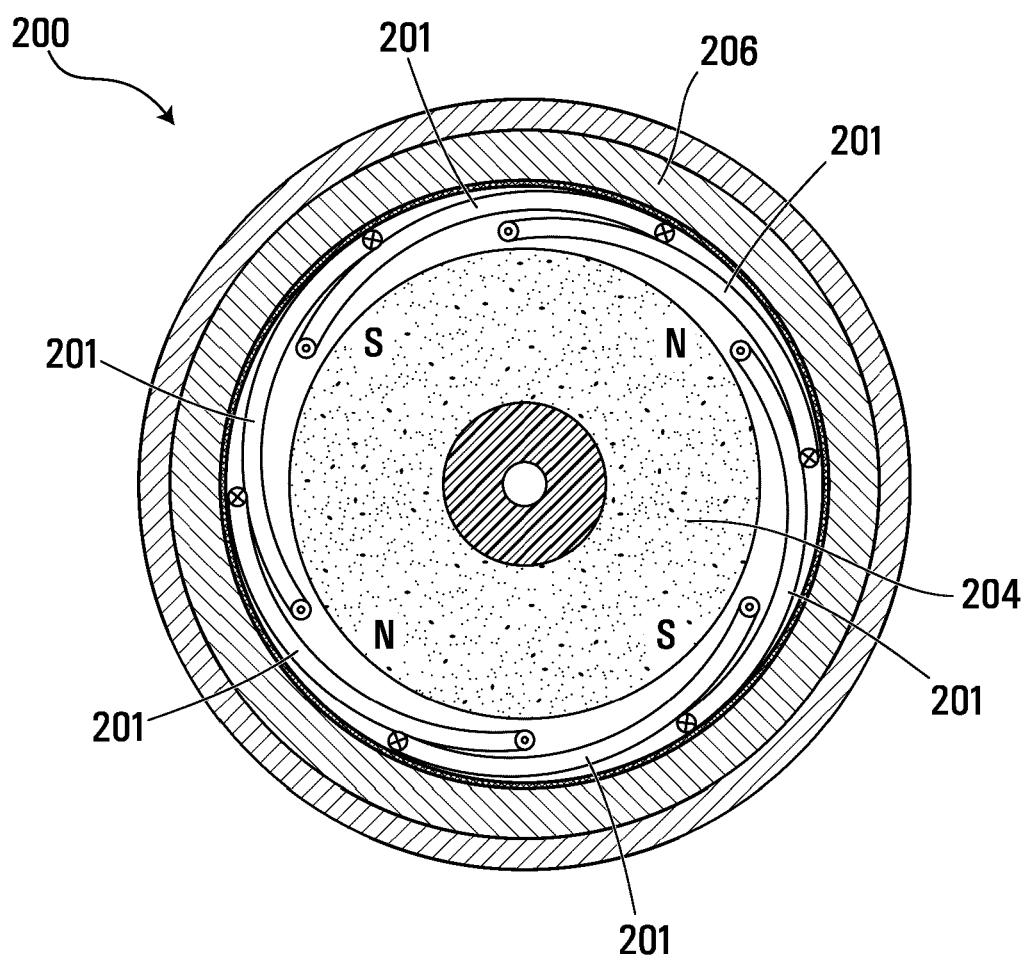
FIG. 2B presents a cross-sectional view of the prior art direct current (DC) brushless motor of FIG. 2A taken along lines A-A.

This equation (Eq. 2) also suggests that the power consumption of the PPM actuator 500 follows a trend that is the inverse of what a conventional motor would follow. Indeed, as can be seen from Prior Art FIG. 1, a conventional DC brushless motor consumes less power as speed increases (due to back EMF), whereas as presented in FIG. 14, the power consumption of the present actuator 500 increases linearly as a function of speed. This line crosses the origin at zero, because the actuator 500 is able to hold a given torque indefinitely without consuming any power. This linear relationship between power input and velocity also implies a very particular efficiency profile. Indeed, it can be seen from the following equation (Eq. 3) that the efficiency $\eta$ of the actuator 500 for a given torque is a constant:

$$\eta = \frac{P_{mech}}{P_{in}} = \frac{\tau \omega}{\omega \frac{1}{2\pi} N_p E_p} = \frac{2\pi \tau}{N_p E_p}.$$

Figure 14:
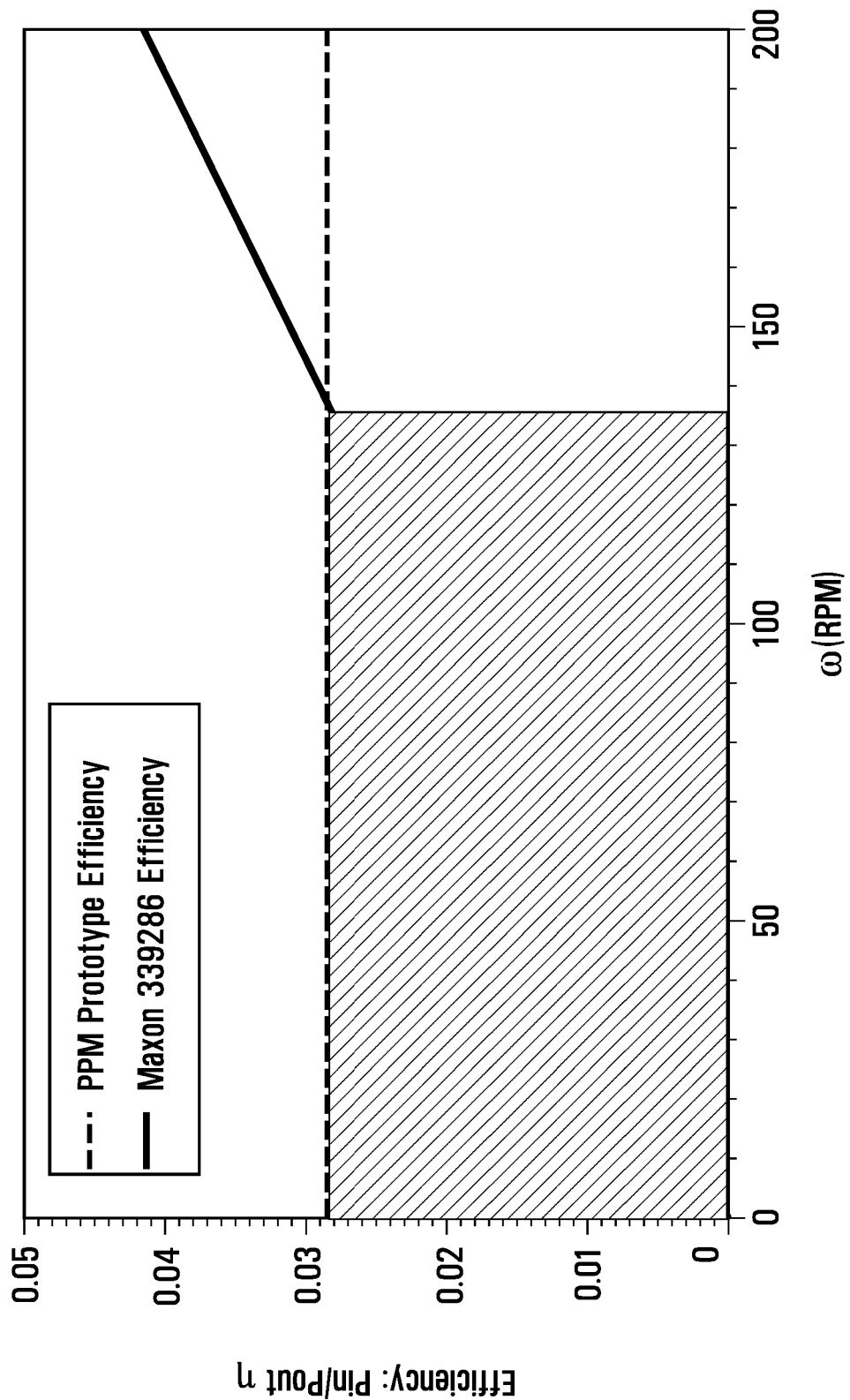
FIG. 14 presents a comparison of the efficiencies of the PPM actuator of FIG. 5A and a prior art Maxon 339286 motor of FIGS. 2A and 2B at low speeds.

Given that the present actuator's 500 efficiency is constant, it will inevitably intersect with the efficiency curve of a conventional motor (which starts with zero efficiency at zero speed). Illustrating this phenomenon, FIG. 14 compares the efficiency ($P_{in}/P_{out}$) of the present PPM actuator 500 with a prior art Maxon 339286 DC brushless motor of very similar diameter and length. The velocity associated with the point at which the two curves intersect represents the superior limit of the range of operations where the actuator 500 is always more efficient than a traditional motor. However, since efficiency is an instantaneous measurement, it may not be the best indicator of each actuator's merits for a given application. A more realistic indicator might be an overall energy consumption. For example, applications like robotic grasping involve a great deal of torque-holding time. In tasks like these, the PPM actuator 500 might consume less energy during the entire task than a conventional motor, even if it is (when rotating) occasionally less efficient than a conventional motor. According to one embodiment, the actuator 500 is able to sustain indefinitely a torque of 200 mN/m, whereas the Prior art Maxon motor that is comparable in size can only continuously produce 69 mN/m.

Another consequence of this particular power consumption profile is that unlike conventional motors wherein heat becomes an issue when the motor needs to hold a given torque steady for prolonged period of time, the present actuator 500 will start overheating as speed increases, since increasing the speed requires sending more pulses of energy per unit of time.

Experimental Results

Figure 15:
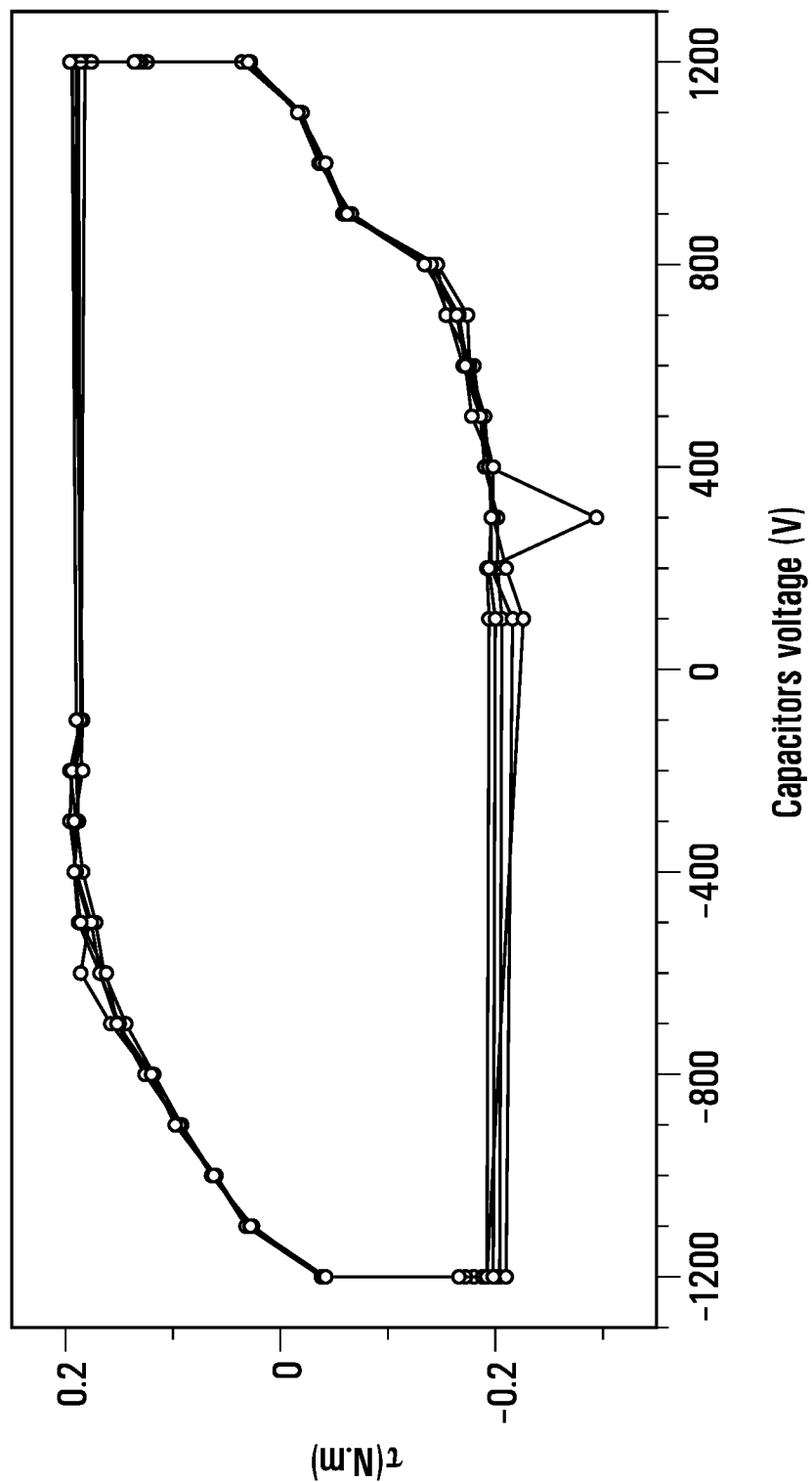
FIG. 15 presents the motor torque of the PPM actuator of FIG. 5A as a function of both the capacitors' terminal voltage and pulse count, according to one embodiment.

FIG. 15 represents the PPM actuator's 500 torque output as a function of the capacitors' terminal voltage before discharging. Each data point is a mean of five torque acquisitions, as measured 10 cm from the shaft rotation center by a force gauge (Mark 10, M4-10). The maximum torque is about 0.2 N·m, as also shown by graph of FIG. 8.

Experimental Results—Halbach Magnetic Flux Density

Figure 17:
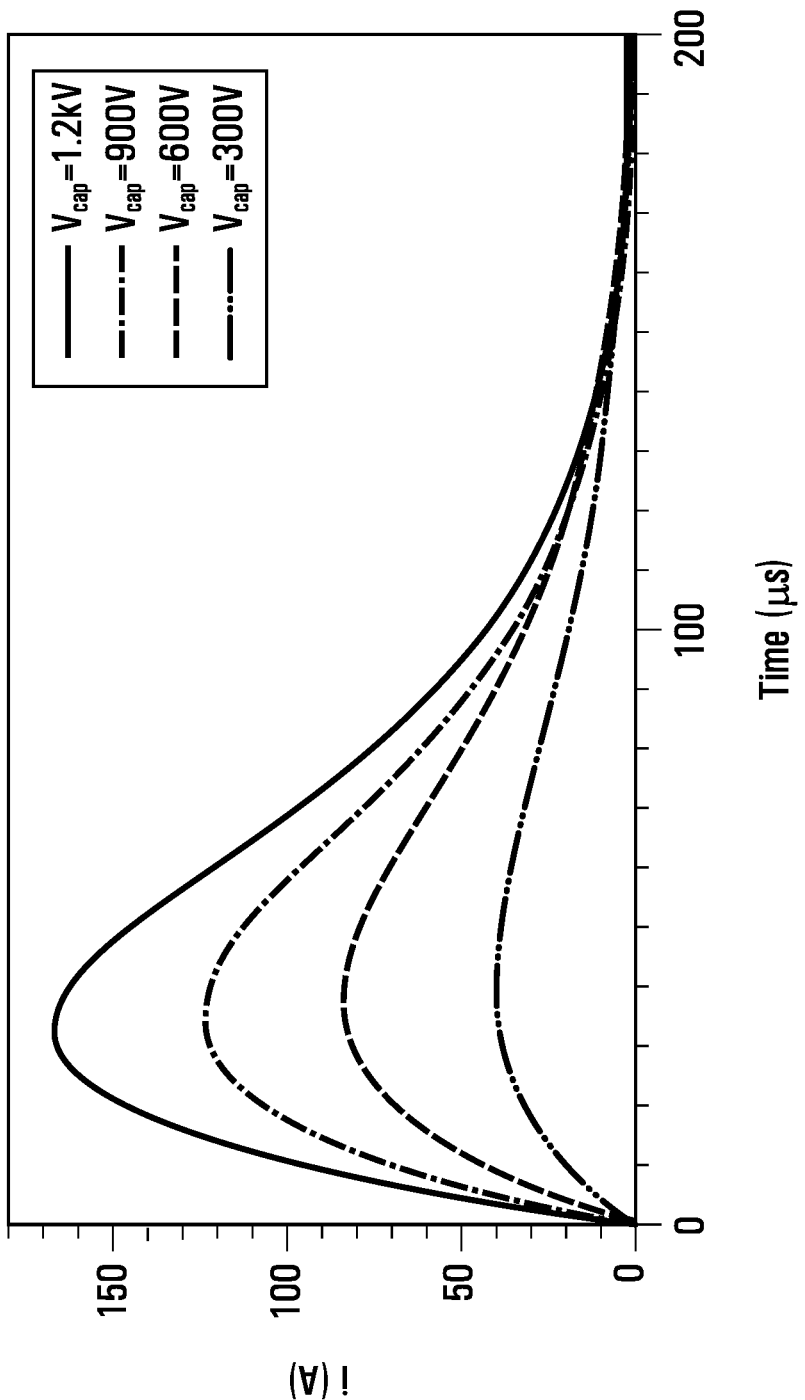
FIG. 17 presents the current pulses in the single Halbach array of FIG. 9, depending on the capacitors' terminal charge voltage, according to one embodiment.

Experimental results of the magnetic field density generated by the Halbach array are shown in FIG. 17 Since the capacitors' pulses magnetize the Halbach array, the magnetic flux density is directly related to the capacitors' voltage before discharge. The magnetic flux density was measured at the center of one of the two Halbach arrays using a Hall effect sensor, such as the SS495A sensor by Honeywell.

Figure 16:
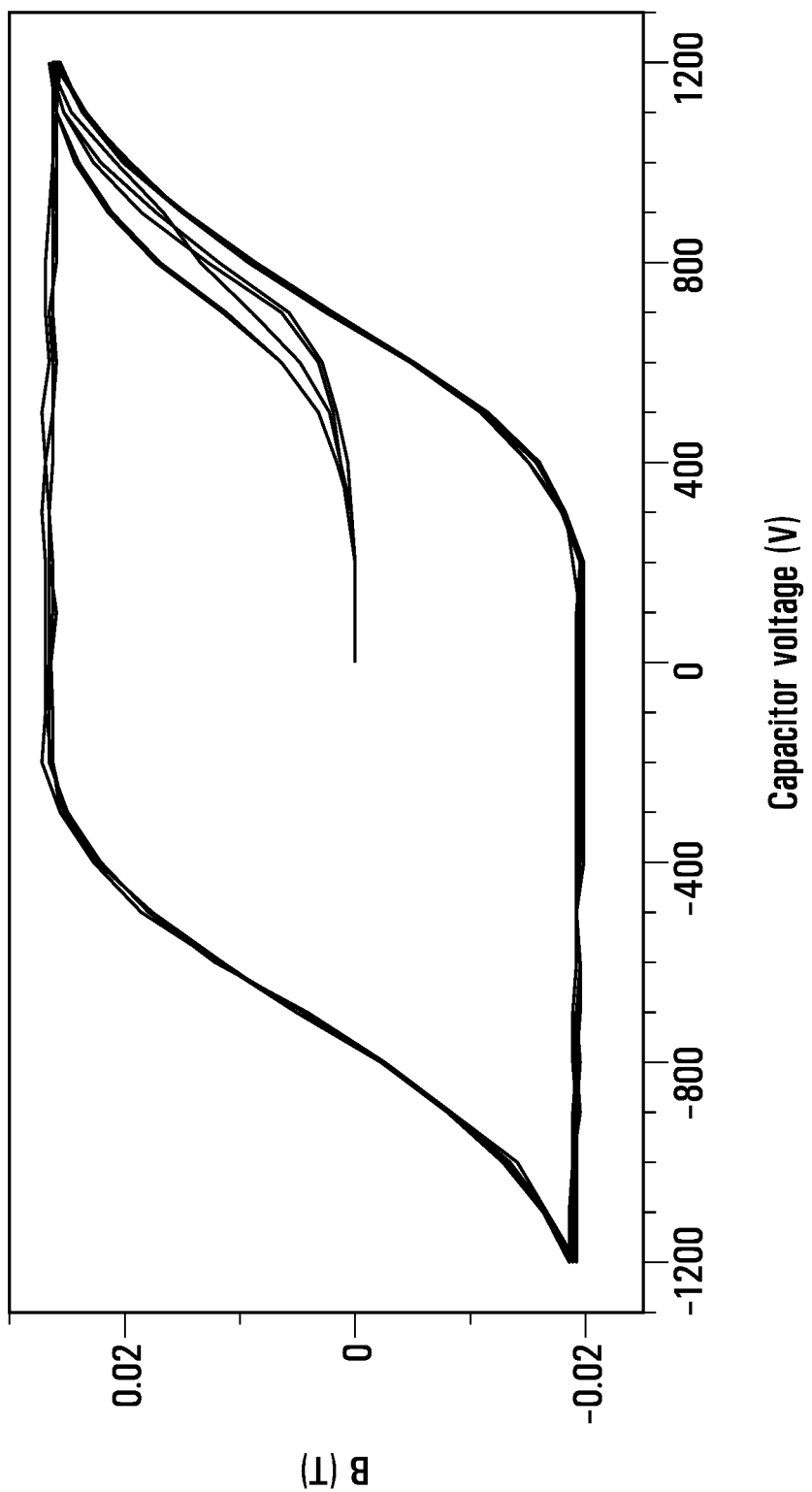
FIG. 16 presents a curve of the Halbach array's magnetic flux density at the center of the PPM actuator of FIG. 5A, according to one embodiment.

The pulse sequence was run five times, and logged autonomously by the microcontroller, as illustrated in FIG. 16. The voltages used for the pulses span from 1.2 kV-100 V with a 100 V interval, and ten (10) pulses were used at each voltage level. Although the curve expresses the Halbach array's magnetic flux density, its shape resembles a magnetization curve. Indeed, the magnetic field density was measured after the pulses, when no applied current was present. The measured magnetic flux density is also fairly low because the use of discrete magnets generates a non-uniform magnetic field that is weakest at the center of the Halbach array.

Experimental Results—Pulse Characterization:

To magnetize ferromagnetic material, large magnetic fields must be generated.

However, these large magnetic fields only have to be maintained during short periods of time (in the order of nanoseconds) for the magnets' magnetic domains to align.

As evidenced by the hysteresis curves of FIG. 11A, the applied magnetic field needed to magnetize a magnet depends on both the magnet's coercivity and its previous magnetic state. High magnetic fields are required when the stator is strongly magnetized in the opposite direction, or if the ferromagnetic material is very hard to magnetize. According to one embodiment, for the drive shaft 508 to make a full rotation using the minimal amount of current pulses (four pulses), the capacitors' voltage must be at least 1150 V.

FIG. 17 shows experimental measures of four current pulses in one Halbach array, using capacitors at different voltages. The pulses were captured with an oscilloscope (Tektronix TDS 1002B) and through a Rogowsky current waveform transducer (Powertek CWT 6B, 5 mV/A sensitivity).

Based on the current generated by the pulses (i), and using the number of wire turns (N) in the solenoid, and the solenoid length (l) as well as the solenoid diameter (d), a rough estimate of the magnetic field (H) created in the center of the solenoid and applied to the associated stator magnet can be computed according to the following (Eq. 5) where l≅d $$H = \frac{Ni}{l}\left(\frac{l}{\sqrt{l^2+d^2}}\right) \cong \frac{Ni}{l\sqrt{2}}$$

Since the solenoids are approximately as long as they are wide, and since multiple layers of wires are used, it is assumed that the generated magnetic field is uniform, and that Eq. 5 is only a crude approximation. Accordingly, for a 1.2 kV charge of the capacitors, creating a 168 A current pulse, generates an applied magnetic field of approximately 598 kA/m, which is consistent with the stator magnet characteristics.

The energy contained in the capacitors is given by Eq. 6. The energy contained in a capacitor depends on its voltage and capacitance. Since the capacitance is constant, it is the capacitor's voltage that dictates the energy of a pulse. According to Eq. 6, the energy contained in the most powerful pulse is obtained by charging the capacitors at 1200 V, and it contains approximately 11.1 Joules:

$$E_p = 1/2 CV^2 \tag{Eq. 6}$$

The present actuator 500 may also lead to multiple avenues for optimization and improvements that will allow the motor to gain efficiency, such as: 1. improved electrical circuits for better resiliency and better control of the pulses; 2. optimized electrical circuits depending on coils inductance and capacitors total capacitance; 3. an improved motor magnetic field with respect to torque generation, magnetic field generation, and demagnetization protection; 4. creation of a hybrid motor by the coupling of this PPM actuator 500 with a conventional electromagnetic motor, which may yield interesting results for upgraded motor bandwidth and rotational speed; and 5. efforts regarding the motor's control.

Method of Controlling an Actuator

According to one aspect, there is a method of controlling an actuator 1800. The method 1800 includes receiving a rotor command 1802. The rotor command can be indicative of a rotor position, a rotor torque or a combination thereof. The method 1800 also includes controlling the magnetic field generation device 1804 (coil winding, strong magnet) according to the rotor command. When the magnetic field generation device is a coil winding the controlling 1804 is performed by controlling the energy input, such as an energy intensity, frequency, path, etc. When the magnetic field generation device is a strong magnet, the controlling 1804 is performed by controlling a distance of the strong magnet with respect to the stator. The method 1800 further includes generating a magnetic field 1806 with the magnetic field generation device according to the controlling 1804 and modifying a magnetization of the stator 1808 with the generated magnetic field. The magnetization of the stator can affect the magnetic resistance (e.g. reluctance) of the stator as well. The method further includes producing a variably controlled magnetic field 1810, according to the modified magnetization of the stator. The produced magnetic field has a variably controlled shape and intensity that are at least in part determined by the magnetization of the stator in order to move the rotor 1812, according to the received command.

It shall be recognized that according to a received torque command 1802, the moving of the rotor 1812 can involve only a change in torque resulting by the combined magnetic fields of the stator and rotor without changing a position of the rotor 1812.

Figure 18:
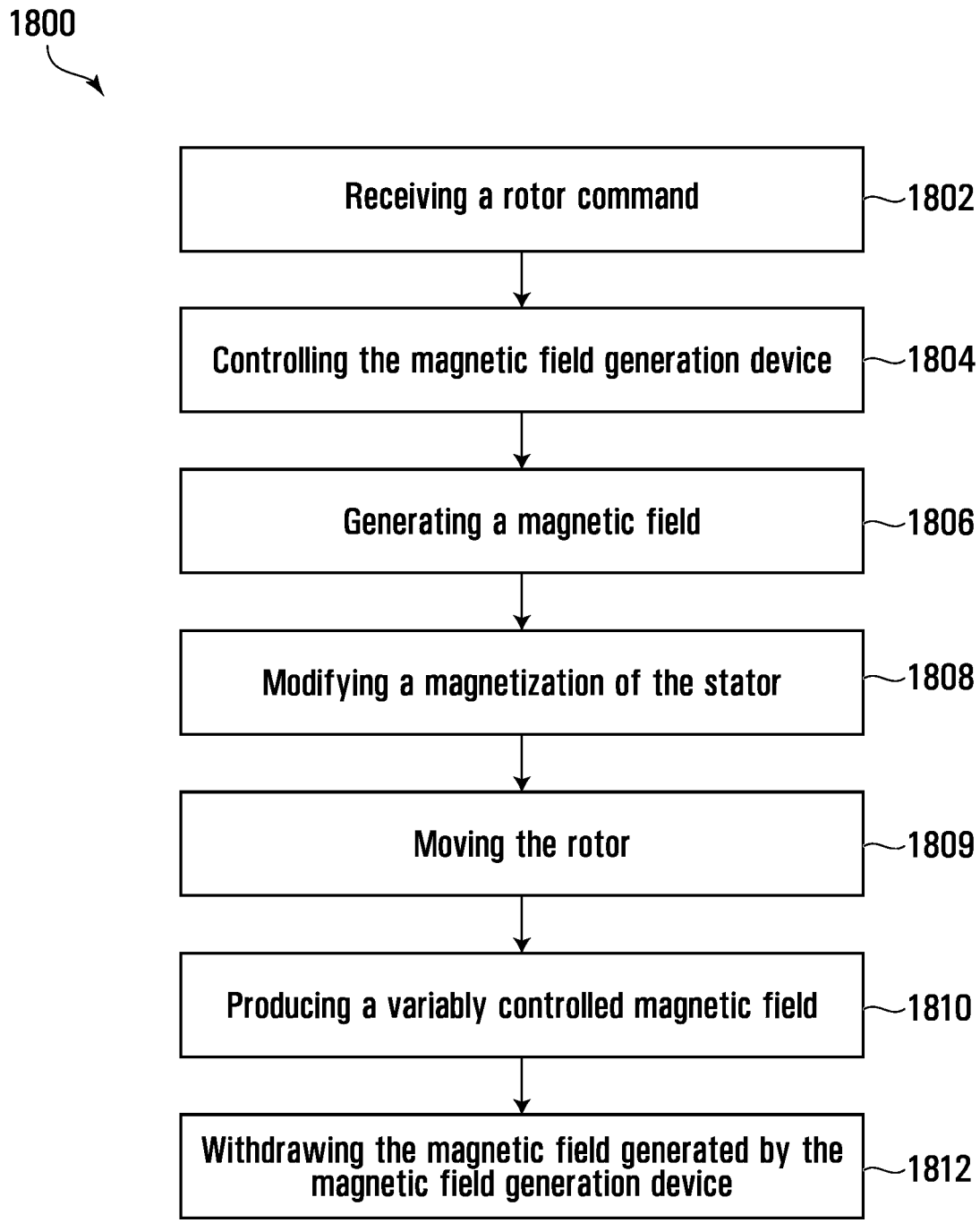
FIG. 18 presents a method of controlling the actuator of FIG. 5A, according to one embodiment.

Moreover, as can be noticed by the diagram of FIG. 18, once the magnetization of the stator is modified 1808, the magnetic field generated by the magnetic field generation device may be withdrawn 1809 without affecting the producing of the magnetic field 1810 or the moving of the rotor 1812.

Also, it shall be recognized that when modifying a magnetization of the stator 1808, a magnetization of the rotor can be modified instead without departing from the method 1800.

Material Influencing Apparatus

According to one aspect, there is a material influencing apparatus that generates a magnetic field to influence another magnetic field produced from moving electrically charged matter or particles, such as used in high energy physics. For instance, the influencing apparatus generates magnetic fields to guide, focus, scatter or deviate electrically charged particles, such as in a particle accelerator, laser, or plasma containment system. In conventional permanent magnet devices the magnetic field is fixed and controlling of the magnetic field is not possible. Also devices using transient magnetic fields based on electrical current in conductors (e.g. coils) continuously consume energy during operation. The present material influencing apparatus made of magnetized hard ferromagnetic material allows the operator to control and modulate the magnetic field and does not require further energy input.

The above embodiments are meant to be exemplary only, and one skilled in the relevant arts will recognize that changes may be made to the embodiments described without departing from the scope of the present solution. For instance, the coils associated to each permanent magnets could be wound around the permanent magnets in any suitable manner to control the creation of magnetic fields. Indeed, the coils winding is a type of magnetic field generation device that can influence a shape, a boundary, an intensity, or any other controllable property of the magnetic fields. The coils may be shaped as Maxwell or Helmholtz coils, without departing from the scope of the present solution. Moreover, any suitable conductive material and wire gauge may be used in in the wiring such as an Aluminum wire having a gauge of 20 AWG (American Wire Gauge).

Figure 19:
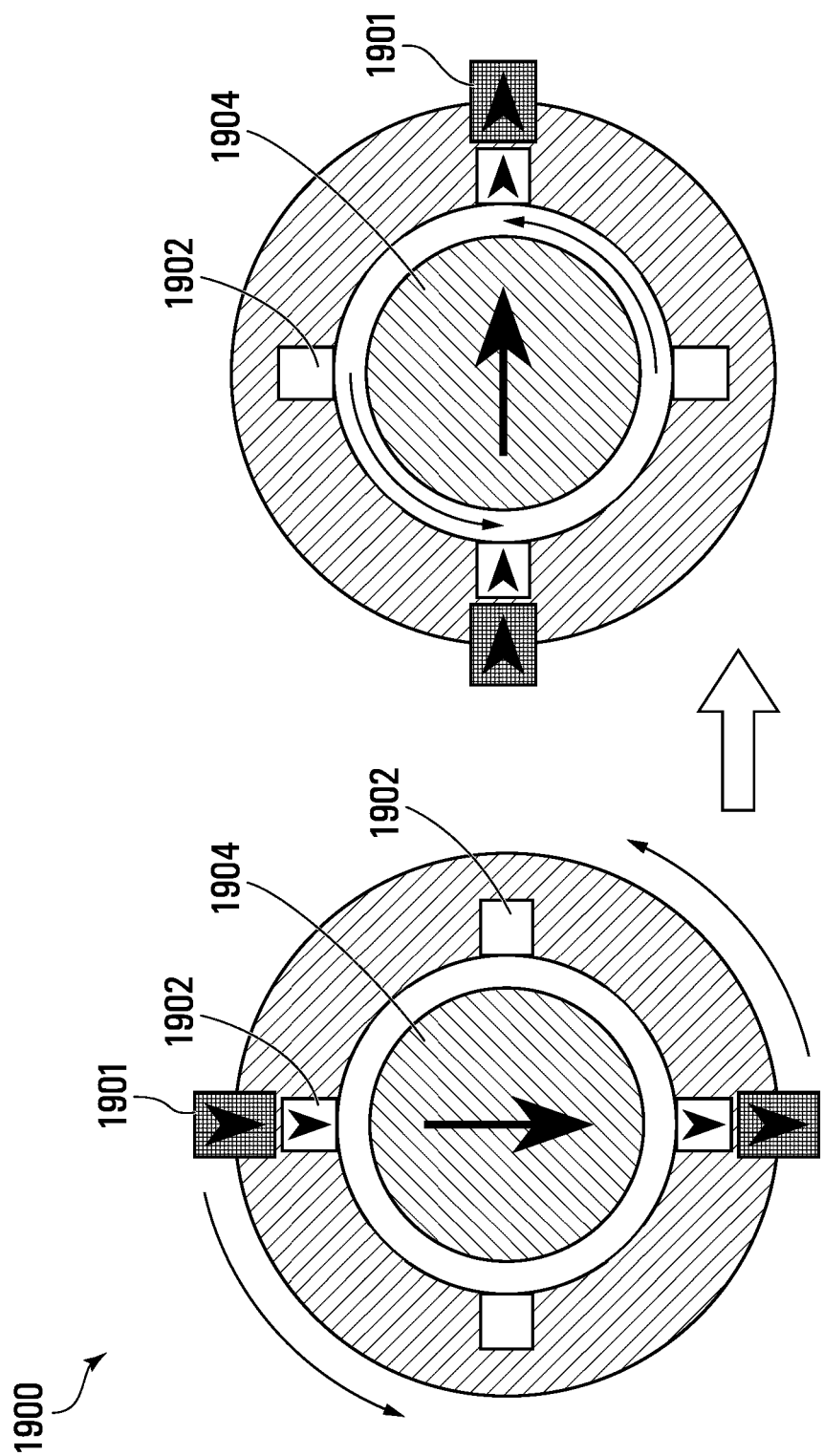
FIG. 19 presents a magnetic field generation device being controlled by a rotatable strong magnet to apply a strong magnetic field to permanent magnets, according to an alternate embodiment.

Moreover, the coil winding or solenoid can be replaced by any other type of magnetic field generation device, means, or combination thereof, capable of changing a magnetic property of the ferromagnetic material or magnet. For instance, the application of heat can either help create, or remove a ferromagnetic material magnetization. The application of vibrations has also been shown to enhance the ability for a ferromagnetic material to retain a magnetic field, and mechanical shocks have been shown to help demagnetize a ferromagnetic material. Finally, a cyclic application of an external magnetic field contained in, for example, another permanent magnet, can magnetize or demagnetize a given ferromagnetic material. Hence, as presented in FIG. 19, one could have a mechanism in which a strong magnet 1901 is rotated around or in a stator and used to apply a strong magnetic field to other permanent magnets 1902 and ferromagnetic material. In FIG. 19, there are two radially positioned magnets 1901 that are moveable to be approached or withdrawn from a stator permanent magnet 1902 in order to modify its magnetization and influence a magnetic field produced in a target region 1904. In the case of an actuator, the target region 1904 can be adapted to receive a rotor. In the case of a particle accelerator, the target region 1904 can be adapted to receive a material or particle.

It shall also be recognized that hard ferromagnetic material as described herein, may be used in any other type of electromagnetic actuator topology for improved performances or additional capabilities. For instance, hard ferromagnetic material magnetization may be used in wide spread operation motors such as memory motors, in motors using permanent magnets such as doubly salient permanent magnets motors, or in flux switching motors. Moreover, the magnetization of hard ferromagnetic material can be used for variable performances generators.

Moreover, the above-mentioned embodiments relating to a rotary system can be replaced by a linear system. Also, in the case of the rotary system, in some embodiments, the rotor as first body and the stator as second body can be interchanged to be the rotor as second body and the stator as first body. Moreover, in some embodiments, either one of the rotor and stator can be a hard ferromagnetic material but in other embodiments, either one of the rotor and stator can be a ferromagnetic material such as iron, without departing from the scope of the present actuator.

It shall further be recognized that in a hybrid actuator, the present actuator 500 being adapted to provide relatively high torque at low RPM can be associated to a conventional actuator that is adapted to produce relatively low torque at high RPM. The hybrid actuator is thereby adapted to provide a desired level of torque at any RPM. For instance, as presented in FIG. 14, the present actuator 500 can provide better efficiency at a rotational speed that is below 135 RPM and a conventional actuator such as the Maxon 339286 can provide better efficiency at a rotational speed that is above 135 RPM. The actuator 500 is adapted to be controlled according to a required rotational speed and according to a control of the conventional actuator.

The invention claimed is:

1. An actuator comprising:
   a first body that is a ferromagnetic material;
   at least one second body that is a single magnetized ferromagnetic material whose a magnetic field alone is able to act on the first body to provide a force between the first body and the second body, the at least one second body being in proximity with the first body;
   a magnetic field generation device associable to each of the at least one second body and adapted to generate a magnetic field in proximity with the at least one associated second body; and
   a controller adapted to control the magnetic field generation device in order to generate a controlled magnetic field adapted to modify a magnetization of the at least one associated second body such as to produce with the at least one second body a required magnetic field to move one of the first or the at least one second body with respect to one another according to a desired position or according to a desired torque to be produced with the first body and the required magnetic field of the at least one second body, where the desired position or the desired torque is maintained even after the application of the controlled magnetic field and where the at least one second body maintains its modified magnetization even when in presence of a resulting magnetic field produced as a result of a relative movement between the first body and the at least one second body.

2. The actuator of claim 1, wherein the magnetic field generation device is adapted to generate a controlled magnetic field that is greater than 200 kA/m.

3. The actuator of claim 1, wherein the magnetic field generation device is a coil winding connected to a power source, and where the controller is adapted to control the magnetic field generation device with high transient current pulses.

4. The actuator of any one of claims 1, wherein the first body is a hard ferromagnetic material.

5. The actuator of claim 1, wherein the controller is adapted to selectively modify a magnetization of the at least one second body such that each of the at least one second body creates a respective torque function.

6. The actuator of claim 1, wherein the at least one second body is a ferromagnetic material having an intrinsic coercivity (Hci) value that is greater than 200 kA/m and a remanence (Br) value that is greater than 0.4 Tesla.

7. The actuator of claim 1, wherein there are at least two second bodies and the at least two second bodies are positioned in a Halbach array arrangement.

8. The actuator of claim 1, further comprising a plurality of actuating layers each comprising the first body and the at least one second body, wherein the controller is adapted to modify a magnetization of the at least one associated second body in order to produce the required magnetic field in each of the plurality of actuating layers respectively.

9. The actuator of claim 1, wherein the actuator is one of a rotary actuator, where one of the first body and the at least one second body is a stator and the other one of the first body and the at least one second body is a rotor, and a linear actuator.

10. The actuator of claim 1, wherein the controller is adapted to modify a magnetization of the at least one associated second body such as to produce a high torque at low RPM (rotations per minute) with the first body and the required magnetic field of the at least one second body.

11. The actuator of claim 1, wherein the controller is adapted to receive a control command according to another actuator.

12. The actuator of claim 1, wherein the controller is adapted to control the magnetic field generation device in order to generate a controlled magnetic field adapted to modify one of a magnetization of the first body and a magnetization of the second body.

13. A robotic gripper comprising an actuator as defined in claim 1.

14. A method of manufacturing a product comprising using a robotic gripper of claim 13 to manipulate the product.

15. A magnetic field generation apparatus comprising:
at least one permanent magnet being arranged in a Halbach array arrangement, each of the at least one permanent magnet having an associated magnetic field generation device; and
a controller adapted to control the associated magnetic field generation device in order to generate a controlled magnetic field adapted to modify a magnetization of the at least one permanent magnet in order to produce a desired magnetic field, where the magnetization of the at least one permanent magnet and the desired magnetic field is maintained even after the generation of the controlled magnetic field.

16. The magnetic field generation apparatus of claim 15 wherein the at least one permanent magnet have an intrinsic coercivity value that is greater than 200 kA/m (Hci >200 kA/m) and a remanence value that is greater than 0.4 Tesla.

17. The magnetic field generation apparatus of claim 15, wherein the associated magnetic field generation device is a coil winding connected to a power source, and where the controller is adapted to control the magnetic field generation device with high transient current pulses.

18. The magnetic field generation apparatus of claim 15, wherein the desired magnetic field provides a desired movement or a desired torque with another moving body that is placed in the desired magnetic field.

19. The magnetic field generation apparatus of claim 18, wherein the desired torque has a torque function that has an approximate sinusoidal shape.

20. The magnetic field generation apparatus of claim 17, wherein the at least one permanent magnet is one of a stator or a rotor in an actuator.

* * * * *